(12) United States Patent
Tomioka et al.

(10) Patent No.: US 7,866,809 B2
(45) Date of Patent: *Jan. 11, 2011

(54) MAILING INK, AND INK TANK FOR MAILING, INK JET RECORDING METHOD FOR MAILING AND INK JET RECORDING APPARATUS FOR MAILING USING THE SAME

(75) Inventors: Hiroshi Tomioka, Tokyo (JP); Hideki Yamakami, Yokohama (JP); Masako Udagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,980

(22) Filed: Apr. 29, 2009

(65) Prior Publication Data

US 2009/0214789 A1 Aug. 27, 2009

Related U.S. Application Data

(63) Continuation of application No. 11/680,198, filed on Feb. 28, 2007, now Pat. No. 7,594,719, which is a continuation of application No. PCT/JP2006/318470, filed on Sep. 12, 2006.

(30) Foreign Application Priority Data

Sep. 14, 2005 (JP) ............................. 2005-266796
Sep. 14, 2005 (JP) ............................. 2005-266797
Sep. 14, 2005 (JP) ............................. 2005-266798

(51) Int. Cl.
 *C09D 11/00* (2006.01)
(52) U.S. Cl. .................. 347/100; 106/31.13; 106/31.15

(58) Field of Classification Search ................. 347/100; 106/31.13, 31.15
See application file for complete search history.

(56) References Cited

U.S. PATENT DOCUMENTS 4,723,129 A 2/1988 Endo et al. .................. 346/1.1

(Continued)

FOREIGN PATENT DOCUMENTS

EP 0 779 347 A2 6/1997

(Continued)

OTHER PUBLICATIONS

Oct. 31, 2006 Written Opinion and International Search Report, and International Preliminary Report on Patentability, in International Application No. PCT/JP2006/318470 (with translations).

*Primary Examiner*—Laura E Martin
(74) *Attorney, Agent, or Firm*—Fitzpatrick, Cella, Harper & Scinto

(57) ABSTRACT

A mailing ink, an ink tank for mailing, an ink jet recording method for mailing and an ink jet recording apparatus for mailing that can reconcile preferable tint and visibility as indicia with readability by a 2-D bar code reader. The ink is a mailing ink used in ink jet recording. In the mailing ink, the ink tank, the ink jet recording method, and the ink jet recording apparatus, the ink provides an 'a*' of from −10 to 15 and a 'b*' of from −50 to −15 according to the CIE L*a*b* color system in a printed portion obtained by applying the ink to a recording medium so as to give an application amount of ink of 4.5 mg per square inch, and provides an integrated value of reflection spectrum of 90 or lower in a wavelength region of from 380 nm to 730 nm in the printed portion.

14 Claims, 9 Drawing Sheets

U.S. PATENT DOCUMENTS

| | | | |
|---|---|---|---|
| 4,724,001 A | 2/1988 | Ohta et al. | 106/22 |
| 4,740,796 A | 4/1988 | Endo et al. | 346/1.1 |
| 4,849,774 A | 7/1989 | Endo et al. | 346/140 R |
| 5,108,504 A | 4/1992 | Johnson et al. | 106/31.37 |
| 5,122,814 A | 6/1992 | Endo et al. | 346/33 R |
| 5,159,349 A | 10/1992 | Endo et al. | 346/33 A |
| 5,298,926 A | 3/1994 | Fukushima et al. | 346/140 R |
| 5,521,621 A | 5/1996 | Endo et al. | 347/15 |
| 5,542,970 A | 8/1996 | Miura et al. | 106/20 D |
| 5,599,386 A | 2/1997 | Sano et al. | 106/22 R |
| 5,674,314 A | 10/1997 | Auslander et al. | 106/21 A |
| 5,738,932 A | 4/1998 | Kondo et al. | 428/195 |
| 5,754,194 A | 5/1998 | Endo et al. | 347/15 |
| 5,804,320 A | 9/1998 | Tomioka et al. | 428/478.2 |
| 5,955,185 A | 9/1999 | Yoshino et al. | 428/304.4 |
| 5,965,252 A | 10/1999 | Santo et al. | 428/329 |
| 5,993,524 A | 11/1999 | Nagai et al. | 106/31.27 |
| 5,997,623 A * | 12/1999 | Lin | 106/31.58 |
| 6,176,908 B1 | 1/2001 | Bauer et al. | 106/31.15 |
| 6,318,852 B1 | 11/2001 | White | 347/100 |
| 6,402,823 B1 | 6/2002 | Garcia Sainz et al. | 106/31.95 |
| 6,460,989 B1 | 10/2002 | Yano et al. | 347/101 |
| 6,517,199 B1 | 2/2003 | Tomioka et al. | 347/101 |
| 6,536,890 B1 | 3/2003 | Kato et al. | 347/100 |
| 6,558,740 B1 | 5/2003 | Santo et al. | 427/146 |
| 6,565,950 B1 | 5/2003 | Tomioka et al. | 428/195 |
| 6,659,601 B2 | 12/2003 | Goto et al. | 347/100 |
| 6,685,999 B2 | 2/2004 | Ichinose et al. | 428/32.25 |
| 6,719,420 B2 | 4/2004 | Tomioka et al. | 347/100 |
| 6,729,718 B2 | 5/2004 | Goto et al. | 347/100 |
| 6,746,114 B2 | 6/2004 | Takahashi et al. | 347/100 |
| 6,821,328 B2 | 11/2004 | Tomioka et al. | 106/31.33 |
| 6,830,709 B2 | 12/2004 | Tomioka et al. | 252/506 |
| 6,863,391 B2 | 3/2005 | Tomioka et al. | 347/100 |
| 7,025,817 B2 | 4/2006 | Kanke et al. | 106/31.51 |
| 7,125,111 B2 | 10/2006 | Udagawa et al. | 347/100 |
| 7,141,105 B2 | 11/2006 | Udagawa et al. | 106/31.49 |
| 7,144,449 B2 | 12/2006 | Udagawa et al. | 106/31.15 |
| 7,198,837 B1 | 4/2007 | Endo et al. | 428/195.1 |
| 7,208,033 B2 | 4/2007 | Kawabe et al. | 106/31.48 |
| 7,229,166 B2 | 6/2007 | Tomioka et al. | 347/100 |
| 7,244,299 B2 | 7/2007 | Tsuji et al. | 106/31.48 |
| 7,267,716 B2 | 9/2007 | Nagashima et al. | 106/31.6 |
| 7,445,666 B2 | 11/2008 | Yanagimachi et al. | 106/31.47 |
| 2002/0005871 A1 | 1/2002 | Horio et al. | 347/11 |
| 2003/0098905 A1* | 5/2003 | Taniguchi et al. | 347/100 |
| 2003/0106461 A1 | 6/2003 | Sano | 106/31.27 |
| 2003/0136299 A1* | 7/2003 | Chien et al. | 106/31.27 |
| 2005/0088501 A1 | 4/2005 | Nagashima et al. | 347/100 |
| 2006/0012657 A1 | 1/2006 | Nagashima et al. | 347/100 |
| 2006/0234018 A1 | 10/2006 | Nagashima et al. | 428/195.1 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0188572 A1 | 8/2007 | Takayama et al. | 347/100 |
| 2008/0136862 A1 | 6/2008 | Kawabe et al. | 347/29 |

FOREIGN PATENT DOCUMENTS

| | | |
|---|---|---|
| JP | 59-078273 | 5/1984 |
| JP | 61-59911 B2 | 12/1986 |
| JP | 2-167772 | 6/1990 |
| JP | 2-233783 | 9/1990 |
| JP | 3-8669 B2 | 2/1991 |
| JP | 5-000518 | 1/1993 |
| JP | 8-73791 | 3/1996 |
| JP | 9-241555 | 9/1997 |
| JP | 9-291247 | 11/1997 |
| JP | 2001-106946 | 4/2001 |
| JP | 2001-220529 | 8/2001 |
| JP | 2002-220555 | 8/2002 |
| JP | 2002-285053 | 10/2002 |
| JP | 2002-285054 | 10/2002 |

* cited by examiner

US 7,866,809 B2

MAILING INK, AND INK TANK FOR MAILING, INK JET RECORDING METHOD FOR MAILING AND INK JET RECORDING APPARATUS FOR MAILING USING THE SAME

This application is a continuation of application Ser. No. 11/680,198 filed Feb. 28, 2007, which is a continuation of International Application No. PCT/JP2006/318470, filed Sep. 12, 2006, which claims the benefit of Japanese Patent Application Nos. 2005-266796, filed Sep. 14, 2005, 2005-266797, filed Sep. 14, 2005 and 2005-266798, filed Sep. 14, 2005.

BACKGROUND OF THE INVENTION

1. Field of the Invention

The present invention relates to a mailing ink, which has a preferable tint as a blue color as well as excellent readability of 2-D (two-dimensional) bar code and can form postal markings. The present invention also relates to an ink tank for mailing, an ink jet recording method for mailing and an ink jet recording apparatus for mailing using this ink.

2. Related Background Art

An ink-jet recording method is a system in which minute droplets of an ink are ejected to apply them to a recording medium such as paper, thereby conducting recording. For example, Japanese Patent Publication No. 61-59911 discloses a thermal ink jet recording method in which electro-thermal converters are used as ejection-energy supply means to apply thermal energy to an ink so as to generate bubbles, thereby ejecting droplets of the ink. According to this method, the formation of a high-density multi-orifice in an ink-jet recording head can be realized with ease, and high-resolution and high-quality images can be recorded at high speed.

Inks are used for various purposes by using this technique. Such purposes are not limited to the mere formation of beautiful color images such as photographs and business documents and extend to industrial purposes, for example, a purpose of printing postal markings (hereinafter also referred to as indicia) in large quantities and at high speed in the field of mailing business. The utilization of the ink jet recording technique in the mailing field is made not only in America and Japan, but also in various European countries. For example, in Germany, France and Switzerland, ink jet recording apparatus for forming blue indicia are put to practical use.

With the advancement of digital documentation in the mailing field in recent years, a mailing system making use of such indicia that information has been added thereto by using a 2-D bar code is put to practical use. The 2-D bar code makes it possible to achieve automated and labor-saved sorting and inputting operations and improve services for customers, because a great amount of information can be recorded at high density and read.

A fluorescent ink for mailing systems which can satisfy both properties of water fastness and fluorescence intensity comprises a water-soluble resin and a pigment is reported as a mailing ink in U.S. Pat. No. 6,176,908. In this mailing system, an indicia is printed on mail matter with the ink, and the indicia is read by a dedicated machine, whereby the postage, mailed district of the mail, recorder of the indicia, etc. can be known.

On the other hand, an ink comprising a cyan dye and a magenta dye having respective specific structures in a specific ratio is disclosed as a blue ink in Japanese Patent Application Laid-Open No. 2001-220529. This ink is said to be high in printing density and excellent in reliability on recording apparatus.

It has also been known to mix several kinds of coloring materials for representing an intended color as a print. For example, inks comprising both a black type color coloring material and a cyan type color coloring material are disclosed in Japanese Patent Application Laid-Open No. 2001-106946 and the like. However, the visually recognized color of all the inks disclosed is black, and no blue ink has been reported.

A recording apparatus, which is equipped with first and second electrodes, to which voltages different from each other can be applied, thereby inhibiting the generation of ink mist is reported in Japanese Patent Application Laid-Open No. H05-000518.

SUMMARY OF THE INVENTION

However, conventional blue indicia circulating in various European countries such as Germany, France and Switzerland have been unable to sufficiently satisfy preferable tint and visibility as indicia with readability by a 2-D bar code reader in some cases.

It is an object of the present invention to provide a mailing ink that can satisfy preferable tint and visibility as indicia with readability by a 2-D bar code reader.

Another object of the present invention is to provide an ink tank for mailing, an ink jet recording method for mailing and an ink jet recording apparatus for mailing using such an ink.

In the course of investigation of the above objects, it has been recognized as an important factor for the printed portion to have a specific tint and density because a preferable hue and chroma are prescribed from the viewpoints of customs of the circulated district, designation by the mail service authorities, and the like, and there is a need of taking visibility of indicia into consideration.

It has also been found that spectral characteristics determined by spectral characteristics of a light source of a bar code reader, wavelength sensitivity characteristics of a light-receiving portion, and the like correlate with reflection spectral characteristics of a 2-D bar code to be read. For example, it has been found that a printed portion of the 2-D bar code has such wavelength characteristics that a wavelength region high in sensitivity in the bar code reader is absorbed, whereby the reading rate of the 2-D bar code can be improved.

From the result of a further investigation by the present inventors, it was necessary to take into consideration difference in characteristics between bar code readers of different types, stability of readability of a bar code reader, etc. It has also been found that reflection spectral characteristics of the printed portion are required to have some latitude to readability in order to realize stable reading accuracy for various mails.

The present invention has been led to completion on the basis of the above investigations to achieve the above objects.

Specifically, the present invention provides a mailing ink for use in ink jet recording, which provides an 'a*' of from −10 to 15 and a 'b*' of from −50 to −15 according to the CIE L*a*b* color system in a printed portion obtained by applying the ink to a recording medium so as to give an application amount of ink of 4.5 mg per square inch, and provides an integrated value of reflection spectrum of 90 or lower in a wavelength region of from 380 nm to 730 nm in the printed portion.

The present invention also provides an ink jet recording ink comprising a plurality of coloring materials, wherein the plurality of coloring materials are C.I. Direct Blue 199, a compound of the following Exemplified Compound M8 and a compound of the following Exemplified Compound Bk7, and the proportion (C.I. Direct Blue 199:Exemplified Compound M8:Exemplified Compound Bk7) of C.I. Direct Blue 199 to the following Exemplified Compound M8 to the following Exemplified Compound Bk7 is 1: (0.3 to 0.4):(0.1 to 0.4) by mass.

The present invention further provides an ink tank for mailing, an ink jet recording method for mailing and an ink jet recording apparatus for mailing using the mailing ink.

According to the present invention, it is possible to provide inks capable of obtaining prints having a preferable tint as indicia as well as excellent visibility and of being readable even when 2-D bar code readers having various spectral characteristics are used. The present invention can provides inks capable of satisfying the two objects of providing indicia having a preferable tint as indicia and excellent visibility and providing indicia having a stable 2-D bar code with low fractions defective of reading with a good balance at a high level.

According to the present invention, there can also be provided an ink tank for mailing, an ink jet recording method for mailing and an ink jet recording apparatus for mailing using these inks.

DESCRIPTION OF THE EMBODIMENTS

Figure 1:
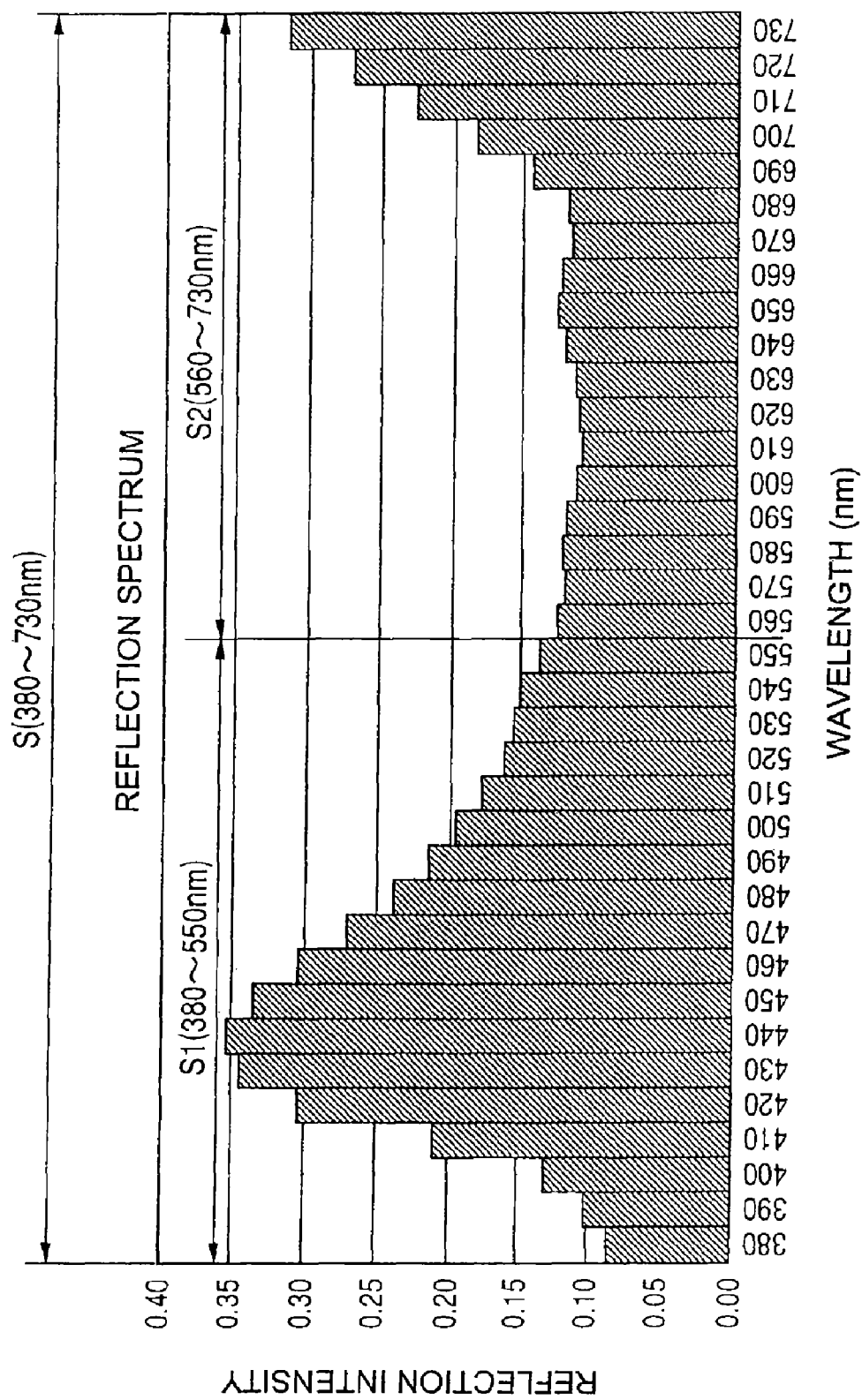
FIG. 1 illustrates a method for calculating out an integrated value of a reflection spectrum of a printed portion with an ink according to the present invention.

The present invention will hereinafter be described in detail by preferred embodiments of the present invention.

The present invention provides a mailing ink for use in ink jet recording, which provides an 'a*' of from −10 to 15 and a 'b*' of from −50 to −15 according to the CIE L*a*b* color system in a printed portion obtained by applying the ink to a recording medium so as to give an application amount of ink of 4.5 mg per square inch, and provides an integrated value of reflection spectrum of 90 or lower in a wavelength region of from 380 nm to 730 nm in the printed portion.

The printed portion defined in this description is a solid printed portion obtained under the condition that the application amount of the ink to the recording medium is 4.5 mg per square inch. This application amount corresponds to, for example, an application amount of the ink where the ejection amount per dot is 25 ng and the ink is applied to all pixels at an image resolution of 600×300 dots per square inch (hereinafter referred to as "image resolution of 600×300 dpi"). The recording medium used preferably has the properties of an ISO whiteness degree of 80 to 90% and a Stökigt sizing degree of 10 to 60 seconds.

The color (a*, b*) of the printed portion falls within the above range, thereby providing a preferable tint easy to be recognized without a sense of incompatibility as a blue color of indicia in various European countries, particularly, in districts such as Germany, France and Switzerland. Further, when the integrated value of the reflection spectrum is not higher than the above value, the color becomes a tint that is not too bright and is quiet, so that visibility is improved irrespective of the kinds of mails and color developability preferable as indicia is achieved. In 2-D bar codes formed by the ink, reflection spectrum in the visible region are suppressed low as a whole, so that their readability by bar code readers having various wavelength sensitivity characteristics can be improved, and a fraction defective of reading can be reduced.

In the present invention, 'a*' and 'b*' in the CIE L*a*b* color system of the printed portion are preferably from 0 to 10 and from −40 to −15, respectively, from the viewpoint of tint. When the integrated value of reflection spectrum in a wavelength region of from 380 nm to 730 nm in the printed portion is controlled to 80 or lower, the reading accuracy of the 2-D bar code is more improved, and so the fraction defective of reading for various kinds of envelopes can be lessened. Further, the integrated value is preferably controlled to 30 or higher. When the integrated value is 30 or higher, a preferable tint is easily provided.

In the present invention, the ratio (S1/S2) of an integrated value S1 of reflection spectrum in a wavelength region of from 380 nm to 550 nm to the integrated value S2 of reflection spectrum in a wavelength region of from 560 nm to 730 nm is preferably 1.2 or higher. When the relationship of the reflection spectrum of the printed portion falls within this range, the chroma of the color of the printed portion becomes high and the color becomes brighter while retaining high reading accuracy of the 2-D bar code, so that the visibility is also more improved. Further, S1/S2 is preferably 3.0 or lower. When S1/S2 is 3.0 or lower, a preferable integrated value is easily obtained.

Incidentally, the integrated value of the reflection spectrum in the present invention can be determined by means of a spectrophotometer in accordance with a method known per se in the art. For example, a reflection spectrum of a printed portion obtained under the above-described conditions is determined by means of Spectrolino manufactured by Gretag Co. under conditions of observation light source: D50, observation viewing angle: 2 degrees, density: ANSI. A, white standard: Abs and filter: No. The resultant reflection spectrum is represented with reflection intensities at every 10 nm in a region of from 380 to 730 nm (FIG. 1). The reflection intensity is indicated by regarding reflection intensity of light reflected on an ideal perfect diffuse reflection surface, i.e., reflection intensity in the case where a reflectivity is 100%, as 1.0. The integrated value S of the reflection spectrum is represented as a product obtained by totalizing reflection intensities at the respective wavelengths and multiplying the totalized value by 10 nm (wavelength width). The integrated value S of the reflection spectrum in FIG. 1 corresponds to the area of the shaded portion from 380 nm to 730 nm. Likewise, the integrated value S1 from 380 nm to 550 nm is represented as a product obtained by multiplying the totalized value of the reflection intensities at the respective wavelengths by 10 nm (wavelength width). The integrated value S1 of the reflection spectrum in FIG. 1 corresponds to the area of the shaded portion from 380 nm to 550 nm. The integrated value S2 at from 560 nm to 730 nm is the difference between S and S1 and can be determined by S−S1. The integrated value S2 in FIG. 1 corresponds to the area of the shaded portion from 560 nm to 730 nm. S1/S2 is calculated out from the S1 and S2 values thus obtained.

The ink according to the present invention is required to form a printed portion exhibiting a blue color of a specific tint upon printing on a recording medium and having specific reflection spectrum characteristics. In order to meet such a requirement, the ink preferably comprises one coloring material having specific absorption characteristics or a combination of two or more thereof. As the coloring material, either dyes or pigments may be used. Dyes may be suitably chosen for use from direct dyes, acid dyes, basic dyes, reactive dyes, disperse dyes, etc. The direct dyes and acid dyes are preferably used from the viewpoints of color developability on a recording medium, reliability upon ink jet recording, and the like.

Examples of blue type color coloring materials include the following coloring materials:

C.I. Direct Blue: 1, 15, 22, 25, 41, 76, 77, 80, 86, 90, 98, 106, 108, 120, 158, 163, 168, 199, 226, 307, etc.;

C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.;

C.I. Pigment Blue: 1, 2, 3, 15, 15:2, 15:3, 15:4, 16, 22, 60, etc.;

C.I. Acid Blue: 62, 80, 83, 90, 104, 112, 113, 142, 203, 204, 221, 244, etc.;

C.I. Reactive Blue: 49, etc.;

C.I. Acid Violet: 17, 19, 48, 49, 54, 129, etc.;

C.I. Direct Violet: 9, 35, 47, 51, 66, 93, 95, 99, etc.;

C.I. Reactive Violet: 1, 2, 4, 5, 6, 8, 9, 22, 34, 36, etc.;

C.I. Disperse Violet: 1, 4, 8, 23, 26, 28, 31, 33, 35, 38, 48, 56, etc.;

C.I. Pigment Blue: 15:6, etc.;

C.I. Pigment Violet: 19, 23, 37, etc.; and phthalocyanine compounds represented by the following general formula (1) or salts thereof.

wherein l is 0 to 2, m is 1 to 3, n is 1 to 3, l+m+n is 3 to 4, positions of the substituent groups are 4- or 4'-positions, M is an alkali metal or ammonium, $R_1$ and $R_2$ are, independently of each other, any one of a hydrogen atom, a sulfonic acid group and a carboxyl group (with the proviso that $R_1$ and $R_2$ are not hydrogen atoms at the same time), and Y is any one of a chlorine atom, a hydroxyl group, an amino group, a monoalkylamino group and a dialkylamino group.

Among the coloring materials represented by the general formula (1), are preferably used phthalocyanine compounds obtained by using, as a raw material, a phthalocyanine compound obtained by reacting a 4-sulfophthalic acid derivative or a 4-sulfophthalic acid derivative and a phthalic acid (anhydride) derivative in the presence of a metallic compound, converting the sulfonic acid group to a chlorosulfone group, and then, reacting an aminating agent with the resultant product in the presence of an organic amine. In other words, inks using, as a coloring material, a phthalocyanine compound of the general formula (1), in which an unsubstituted sulfamoyl group (—$SO_2NH_2$) and a substituted sulfamoyl group [the following general formula (2)] have been introduced to the limiting positions of the 4- and 4'-positions in the formula (1), come to have excellent resistance to environmental gases.

General Formula (2)

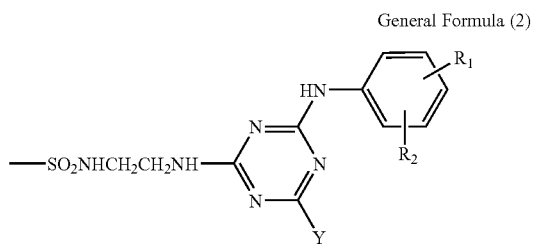

wherein $R_1$ and $R_2$ are, independently of each other, any one of a hydrogen atom, a sulfonic acid group and a carboxyl group (with the proviso that $R_1$ and $R_2$ are not hydrogen atoms at the same time), and Y is any one of a chlorine atom, a hydroxyl group, an amino group, a monoalkylamino group and a dialkylamino group.

As specific examples of compounds represented by the general formula (2), are mentioned exemplified compounds having the following respective structures in the form of a free acid. Among these, Exemplified Compound C1 is preferably used.

General Formula (1)

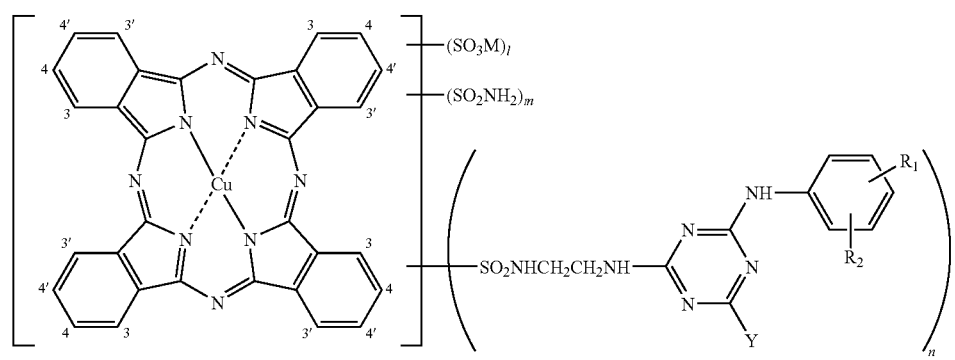

Exemplified Compound C1

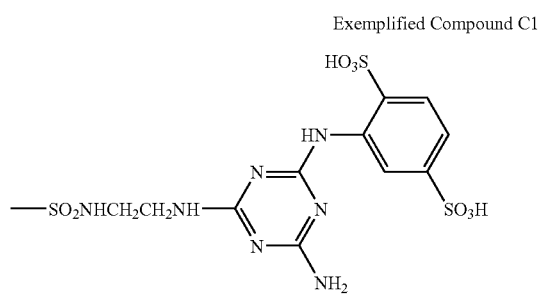

Exemplified Compound C2

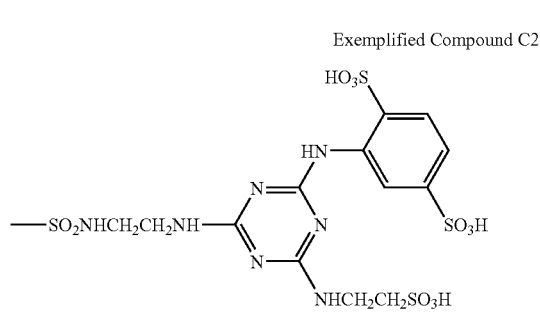

Exemplified Compound C3

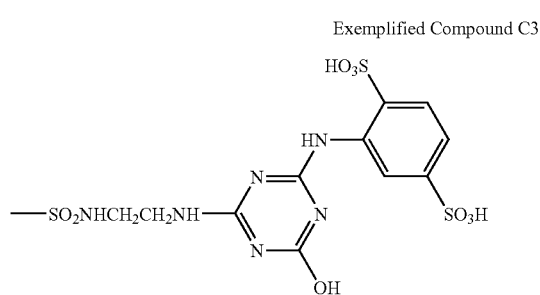

Exemplified Compound C4

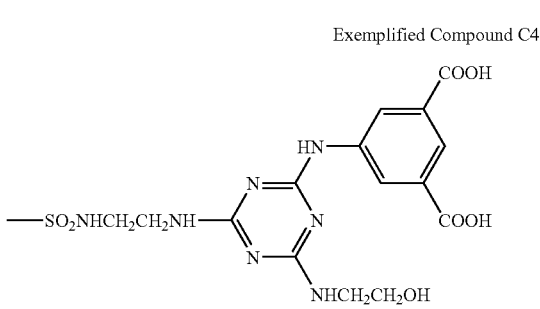

Exemplified Compound C5

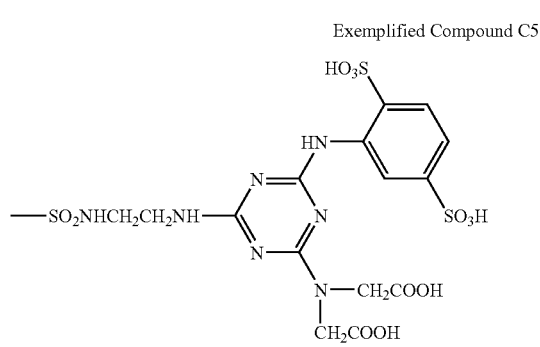

-continued

Exemplified Compound C6

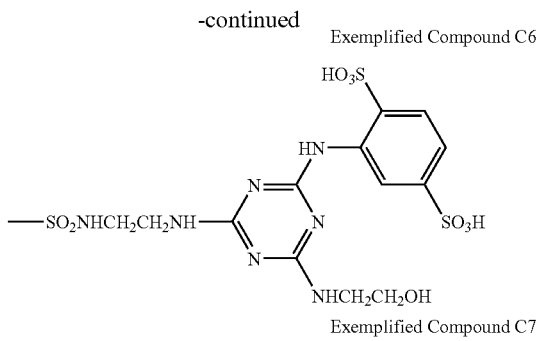

Exemplified Compound C7

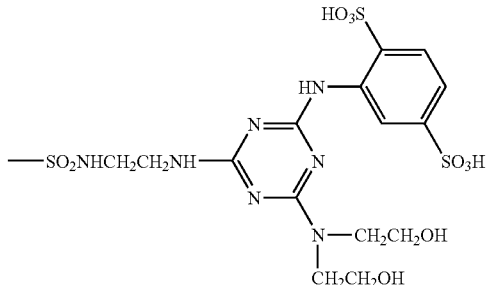

The blue type color coloring materials used in the present invention are preferably phthalocyanine compounds represented by the following formula or salts thereof. Among these, C.I. Direct Blue 199 is preferred.

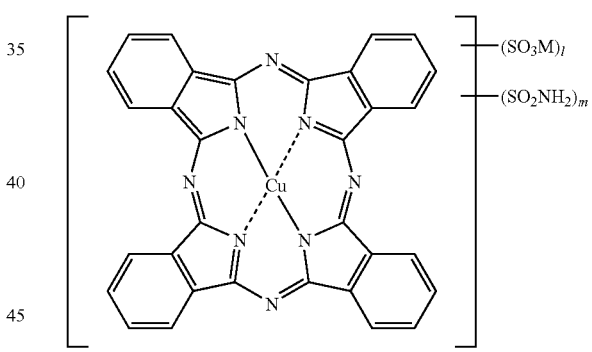

wherein l is 0 to 4, m is 0 to 4, and M is an alkali metal or ammonium.

In the present invention, a coloring material having a different hue with respect to the blue type color coloring materials may be mixed as needed.

Examples of yellow type color coloring materials are mentioned below.

C.I. Direct Yellow: 8, 11, 12, 27, 28, 33, 39, 44, 50, 58, 85, 86, 87, 88, 89, 98, 100, 110, 132, 173, etc.;

C.I. Acid Yellow: 1, 3, 7, 11, 17, 23, 25, 29, 36, 38, 40, 42, 44, 76, 98, 99, etc.;

C.I. Pigment Yellow: 1, 2, 3, 12, 13, 14, 15, 16, 17, 73, 74, 75, 83, 93, 95, 97, 98, 114, 128, 138, 180, etc.; and compounds represented by the following general formula (3) or salts thereof.

General Formula (3)

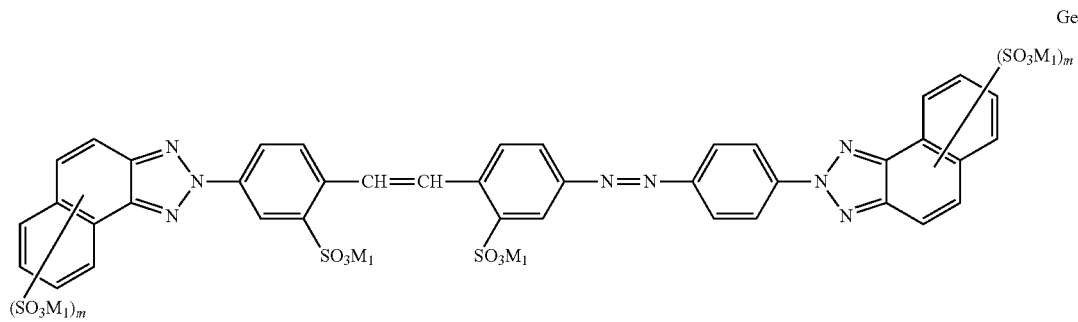

wherein m's are, independently of each other, 1 or 2, and M1's are, independently of one another, any one of a hydrogen atom, an alkali metal, an alkaline earth metal, an organic amine cation and an ammonium ion.

No particular limitation is imposed on preferable examples of the coloring material represented by the general formula (3). However, such structures as shown in the following Table 1 are specifically mentioned. Incidentally, for the sake of convenience, ring structures present at both terminals of the general formula (3) are indicated as A and B rings, the substituted positions are defined as shown in the following general formula (4). Numerals shown in the following Table 1 indicate positions where a sulfonic group has been substituted.

TABLE 1

Exemplified Compounds Y1 to Y4

| No. | Position of substituent group in A ring | Position of substituent group in B ring |
|-----|------------------------------------------|------------------------------------------|
| Y1 | 2 | 4 |
| Y2 | 4 | 4 |
| Y3 | 2 | 4, 6 |
| Y4 | 4, 6 | 4 |

General Formula (4)

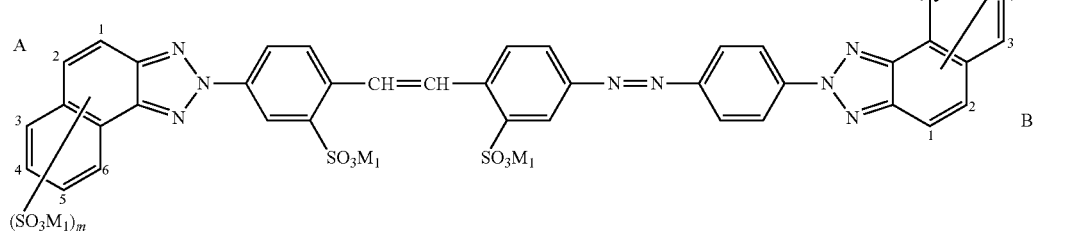

wherein m's are, independently of each other, 1 or 2, and M1's are, independently of one another, any one of a hydrogen atom, an alkali metal, an alkaline earth metal, an organic amine cation and an ammonium ion.

No particular limitation is imposed on preferable examples of the coloring material represented by the general formula (4). However, Exemplified Compound Y1 is specifically mentioned.

Exemplified Compound Y1

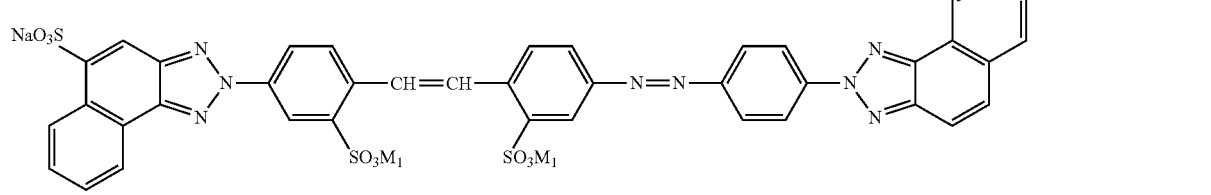

Besides the above-mentioned compounds, compounds of the structures set forth in International Publication No. 99/43754 Pamphlet and International Publication No. 02/081580 Pamphlet are mentioned.

Examples of magenta type color coloring materials are mentioned below.

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, etc.;

C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.:

C.I. Food Red: 87, 92, 94 etc.;

C.I. Direct Violet: 107, etc.;

C.I. Pigment Red: 2, 5, 7, 12, 48:2, 48:4, 57:1, 112, 122, 123, 149, 168, 170, 177, 184, 194, 202, 209, 224, etc.;

C.I. Acid orange: 7, 8, 10, 12, 24, 33, 56, 67, 74, 88, 94, 116, 142, etc.;

C.I. Acid Red: 111, 114, 266, 374, etc.;

C.I. Direct Orange: 26, 29, 34, 39, 57, 102, 118, etc.;

C.I. Food Orange: 3, etc.;

C.I. Reactive Orange: 1, 4, 5, 7, 12, 13, 14, 15, 16, 20, 29, 30, 84, 107, etc.;

C.I. Disperse Orange: 1, 3, 11, 13, 20, 25, 29, 30, 31, 32, 47, 55, 56, etc.;

C.I. Pigment Orange: 43, etc.; and compounds represented by the following general formulae (5) and (6) or salts thereof.

General Formula (5)

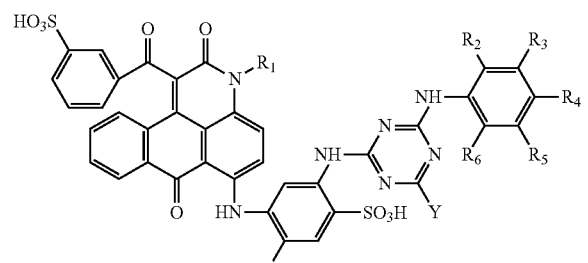

wherein $R_1$ is any one of a hydrogen atom, an alkyl group, a hydroxy lower alkyl group, a cyclohexyl group, a mono- or dialkylaminoalkyl group and a cyano lower alkyl group, Y is any one of a chlorine atom, a hydroxyl group, an amino group and a mono- or dialkylamino group (with the proviso that the portion of the alkyl group may have a substituent group selected from the group consisting of a sulfonic group, a carboxyl group and a hydroxyl group), and $R_2$, $R_3$, $R_4$, $R_5$ and $R_6$ are, independently of one another, any one of a hydrogen atom, an alkyl group having 1 to 8 carbon atoms and a carboxyl group (with the proviso that $R_2$, $R_3$, $R_4$, $R_5$ and $R_6$ are not hydrogen atoms at the same time).

As specific preferable examples of compounds represented by the general formula (5), are mentioned Exemplified Compounds M1 to M7 having the following respective structures in the form of a free acid. Among these, Exemplified Compound M7 is particularly preferred in the present invention.

Exemplified Compound M1

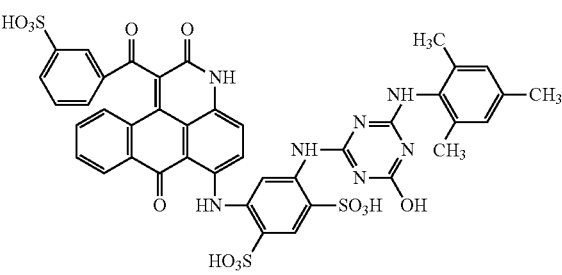

Exemplified Compound M2

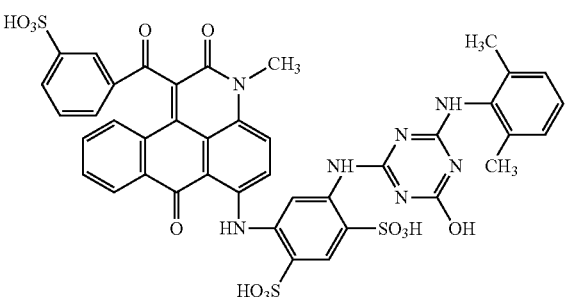

Exemplified Compound M3

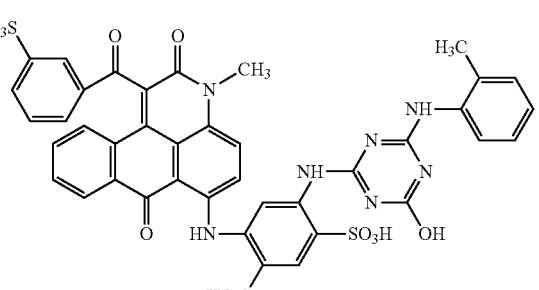

Exemplified Compound M4

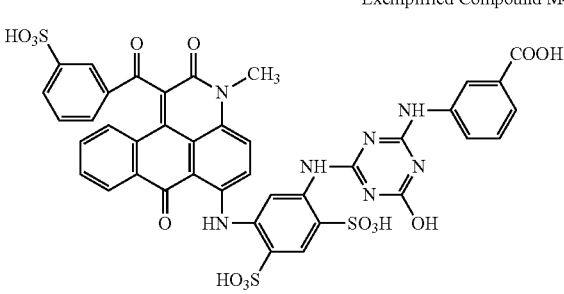

Exemplified Compound M5

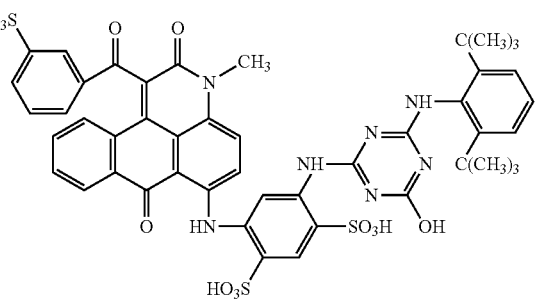

Exemplified Compound M6

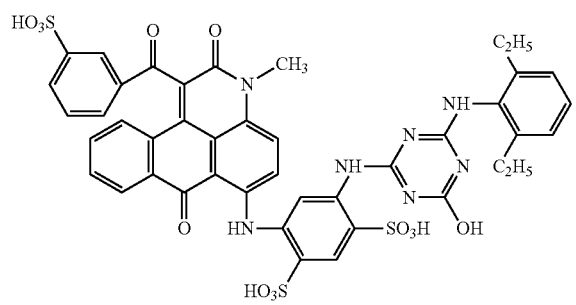

Exemplified Compound M7

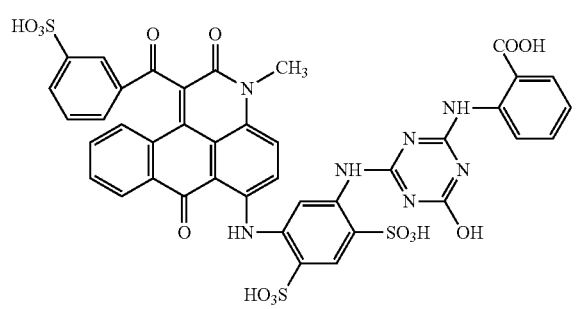

General Formula (6)

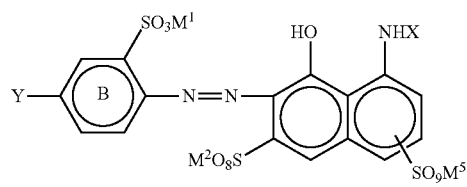

wherein Y is any one of a hydrogen atom, a methyl group, a methoxy group, an acetylamino group and a nitro group and may also form a benzene ring together with the carbon atom at the 3-position of the benzene ring B, X is any one of an acetyl group, a benzoyl group, a p-toluenesulfonyl group and a 4-chloro-6-hydroxy-1,3,5-triazin-2-yl group, and $M^1$, $M^2$ and $M^3$ are, independently of one another, any one of an alkali metal and ammonium.

Specific preferable examples of compounds represented by the general formula (6) are described in Japanese Patent Application Laid-Open No. 59-78273. Particularly preferred compounds are mentioned below. Among these, Exemplified Compound M8 is particularly preferred in the present invention.

Exemplified Compound M8

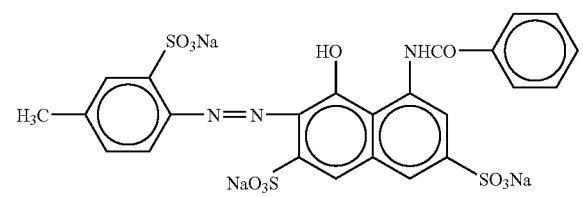

Exemplified Compound M9

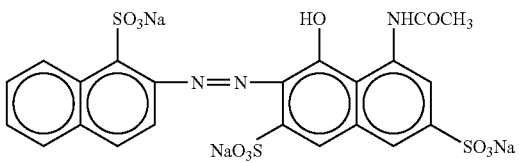

Exemplified Compound M10

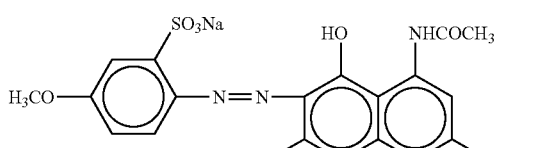

Exemplified Compound M11

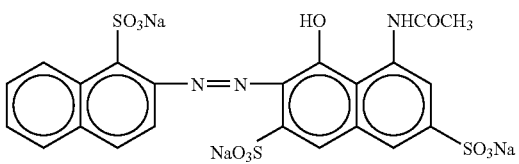

Other magenta type color and red type color coloring materials include compounds described in Japanese Patent Application Laid-Open No. H08-73791, U.S. Pat. No. 5,599,386 and Japanese Patent Application Laid-Open No. H09-241555.

Examples of green type color coloring materials are mentioned below.

C.I. Acid Green: 1, 3, 5, 6, 9, 12, 15, 16, 19, 21, 25, 28, 81, 84, etc.;

C.I. Direct Green: 26, 59, 67, etc.;

C.I. Food green: 3, etc.;

C.I. Reactive Green: 5, 6, 12, 19, 21, etc.;

C.I. Disperse Green: 6, 9, etc.; and

C.I. Pigment Green: 7, 36, etc.

Among the above-mentioned coloring materials, C.I. Direct Blue 199 and Exemplified Compound M8 are preferably mixed and used in the present invention from the viewpoints of the color tone of indicia and readability of 2-D bar codes. In the case of this combination, the resulting ink becomes excellent in balance of fastness properties to fading caused by light and gas.

In the present invention, it is more preferable to use a black type color coloring material in combination with the above-described blue type color coloring material and other coloring materials in order to effectively achieve improvement in the reading rate of the 2-D bar code with a small amount of the coloring materials. A small amount of a black type color coloring material is contained, whereby the reflection spectrum in the whole visible region of the printed portion can be effectively lowered, so that the total concentration of the coloring materials contained in the ink can be reduced. As a result, the viscosity of the ink can be lowered to improve ink refill property upon ejection driving at a high frequency and viscosity rise attending on evaporation. This constitution is preferred from the viewpoint of reliability on a printing system because intermittent ejection stability under a low-humidity environment can be improved. In addition, it is preferred even from the viewpoint of cost because the concentration of the coloring materials contained can be reduced.

Incidentally, the black type color coloring material is defined as follows. An aqueous solution or aqueous dispersion containing a black type color coloring material in an amount of 0.003% by mass based on the total mass of the solution or dispersion is first subjected to ultraviolet-visible absorptiometry to obtain an absorption spectrum at from 380 nm to 730 nm. The resultant spectrum is then converted to a CIE L*a*b* color system under conditions of a C light source and a viewing angle of 2 degrees. As a result, a coloring material whose L* is 60 or lower is defined as "a black type color coloring material".

Specific preferable examples of usable black type color coloring materials are mentioned below. However, the coloring materials are not limited thereto.

C.I. Direct Black: 17, 19, 22, 31, 32, 51, 62, 71, 74, 112, 113, 154, 168, 195, etc.;

C.I. Acid Black: 2, 48, 51, 52, 110, 115, 156, etc.;

C.I. Food Black: 1, 2, etc.; compounds described in Japanese Patent Publication No. H03-008669;

carbon black; and compounds represented by the following general formulae (7), (8) and (9) or salts thereof.

General Formula (7)

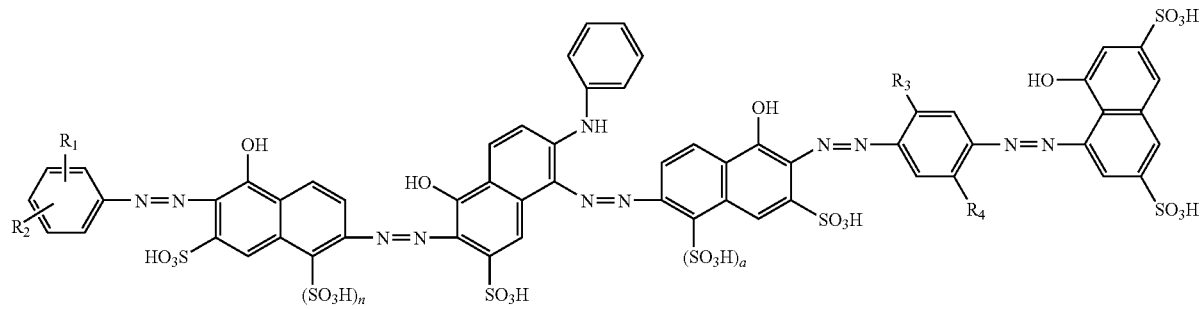

wherein $R_1$ and $R_2$ are, independently of each other, any one of a hydrogen atom, a hydroxyl group, an amino group, a carboxyl group, a sulfonic group, an alkyl group having to 4 carbon atoms and an alkoxy group having 1 to 4 carbon atoms, $R_3$ and $R_4$ are, independently of each other, any one of a hydrogen atom; an alkyl group having 1 to 4 carbon atoms; an alkoxy group having 1 to 4 carbon atoms; a hydroxyl group; an alkyl group having 1 to 4 carbon atoms, which may be substituted by a hydroxyl group or an alkoxy group having 1 to 4 carbon atoms; an alkoxy group having 1 to 4 carbon atoms; which may be substituted by a hydroxyl group, an alkoxy group having 1 to 4 carbon atoms, a sulfonic group or a carboxyl group; and an amino group substituted by an alkyl group or acyl group, and n is 0 or 1.

General Formula (8)

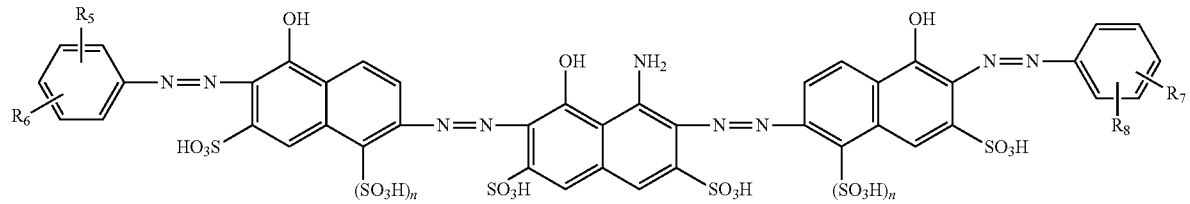

wherein $R_5$, $R_6$, $R_7$ and $R_8$ are, independently of one another, any one of a hydrogen atom; a hydroxyl group; an amino group; a carboxyl group; a sulfonic group; an alkyl group having 1 to 4 carbon atoms; an alkoxy group having 1 to 4 carbon atoms; an alkoxy group having 1 to 4 carbon atoms, which is substituted by a hydroxyl group, an alkoxy group having 1 to 4 carbon atoms, a sulfonic group or a carboxyl group; and an amino group substituted by a phenyl group, an alkyl group or an acyl group and n is 0 or 1.

General Formula (9)

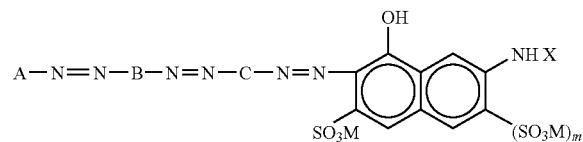

wherein X is any one of a hydrogen atom and a phenyl group which may be substituted by a lower alkyl group or $SO_3M$ group, m is 0 or 1, M is any one of an alkali metal, ammonium and amine, and A, B and C are any one of a benzene ring and a naphthalene ring, which may be substituted, with the proviso that B and C are not naphthalene rings at the same time.

As the substituent groups on A, B and C in the general formula (9) may be mentioned $SO_3M$ groups, lower alkyl groups, lower alkoxy groups, lower alkylcarbonylamino groups, COOM groups, halogen atoms and the like. Incidentally, "lower" means that such a group has 1 to 4 carbon atoms. Examples of M include alkali metals, ammonium and alkylamines, which may be substituted.

Specific preferable examples of coloring materials represented by the general formulae (7) to (9) are mentioned below in the form of a free acid. However, the coloring materials are not limited thereto. Two or more of the coloring materials mentioned below may also be used at the same time. Among these, Exemplified Compound Bk3, Exemplified Compound Bk4 and Exemplified Compound Bk7 are particularly preferably used.

Exemplified Compound Bk1

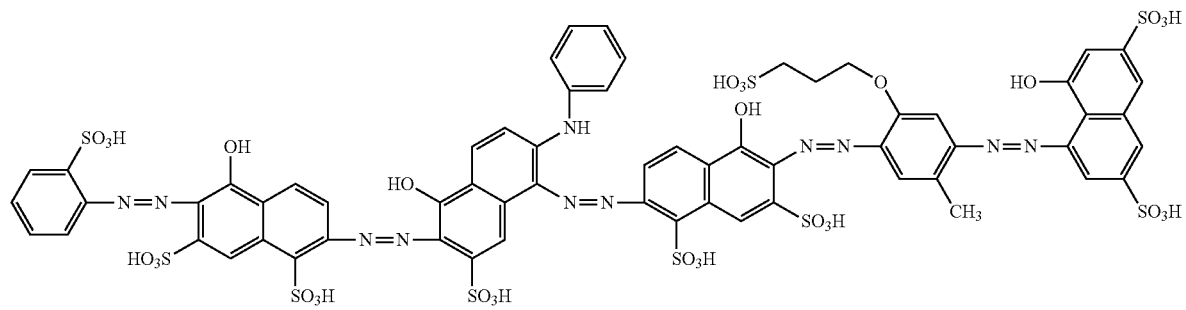

Exemplified Compound Bk2

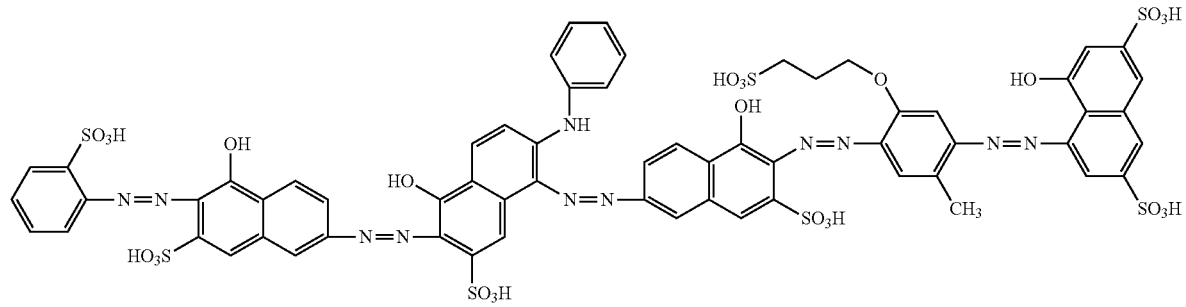

Exemplified Compound Bk3

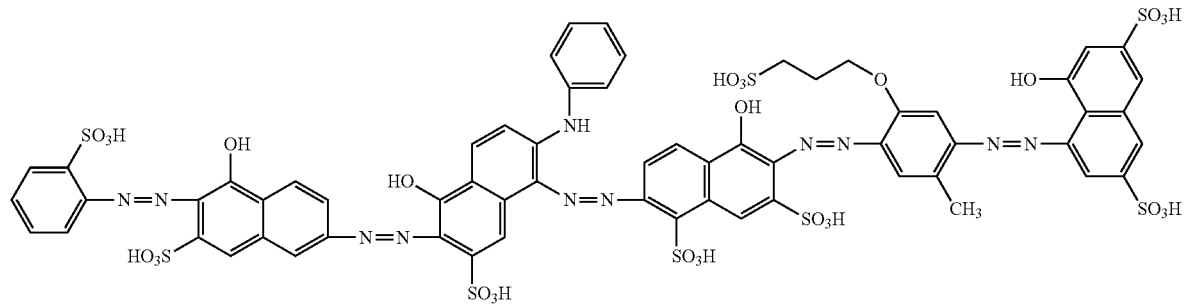

-continued

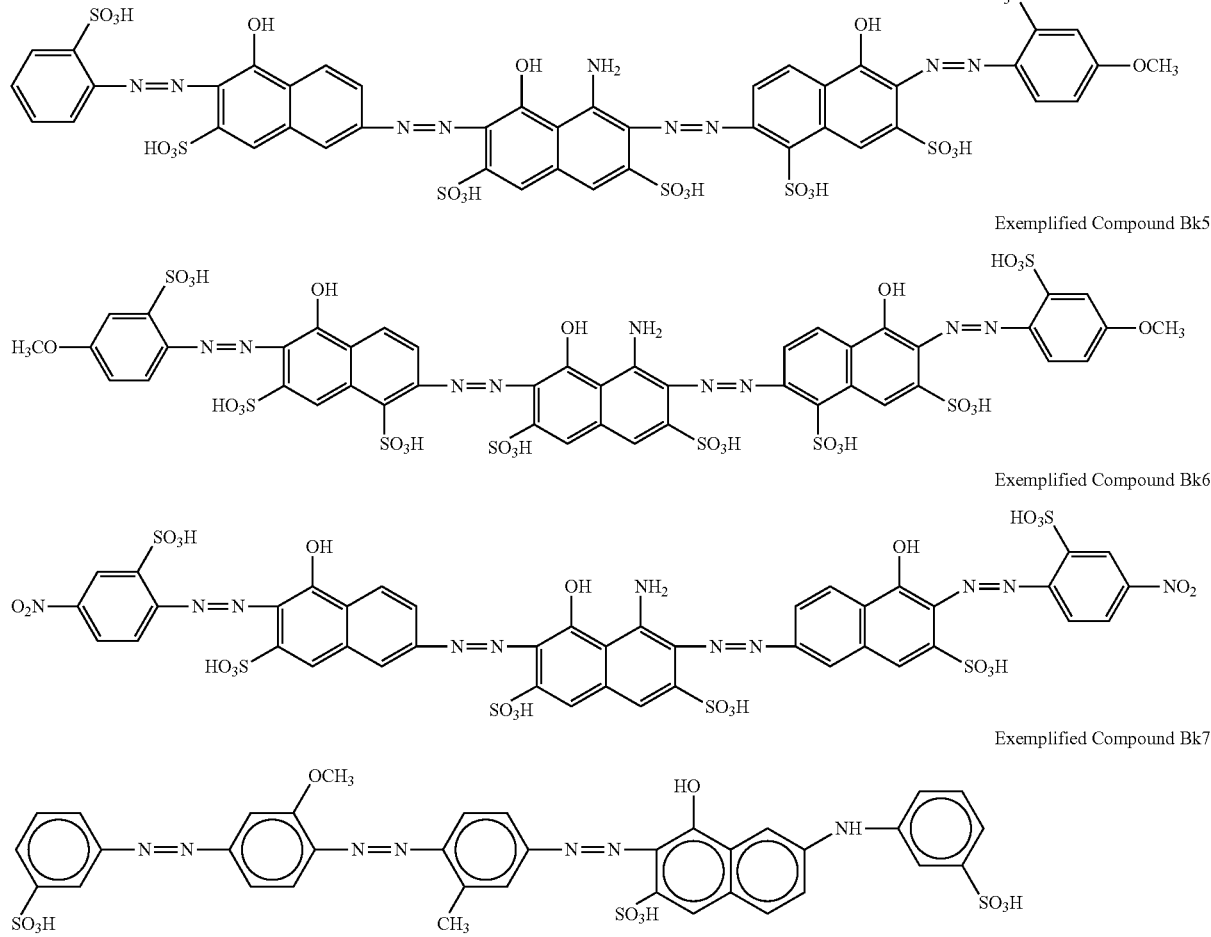

Exemplified Compound Bk4

Exemplified Compound Bk5

Exemplified Compound Bk6

Exemplified Compound Bk7

In the present invention, the ink preferably contains a blue type color coloring material and a black type color coloring material. The proportion (Wbk/Wt) of the concentration Wbk (% by mass) of the black type color coloring material in the ink to the total concentration Wt (% by mass) of all the coloring materials contained in the ink is preferably not lower than 0.04 and lower than 0.5, particularly preferably not lower than 0.05 and lower than 0.3. If the proportion is lower than 0.04, the effect to reduce absorption in the whole visible region is hard to be achieved. If the proportion is 0.5 or higher, the visually recognized color of the resulting print is liable to be closer to a black color rather than a blue color.

Further, a maximum absorption wavelength within a wavelength region of from 380 nm to 730 nm of the absorption spectrum of the black type color coloring material is preferably present between 400 nm and 600 nm. The absorption spectrum of an ink having a visible blue color generally has absorption between 600 nm and 700 nm and show low absorption between 400 nm and 600 nm, so that the reflection spectrum in the visible region of the resulting print become high. The position of the maximum absorption wavelength is set being within the above range, whereby the reflection spectrum in the whole visible region of the print can be more reduced as a whole while maintaining the visible blue color, and so readability by bar code readers having various wavelength sensitivity characteristics can be satisfied at a higher level. The black type color coloring material more preferably has a maximum absorption wavelength between 400 nm and 500 nm.

Among the above-mentioned black type color coloring materials, black type color coloring materials having a maximum absorption wavelength between 400 nm and 600 nm include C.I. Food Black 2 and Exemplified Compound Bk7. However, the black type color coloring materials are not limited thereto.

In the present invention, the condition that an ink contains C.I. Direct Blue 199, Exemplified Compound M8 and Exemplified Compound Bk7 is the most preferable combination from the viewpoints of the color tone of indicia and readability of 2-D bar codes. As for the mass ratio among these coloring materials, in the case where both Exemplified Compound M8 and Exemplified Compound Bk7 are in the form of a Na salt, it is preferable that proportions of the coloring materials of Exemplified Compound M8 and Exemplified Compound Bk7 be from 0.3 to 0.4 and from 0.1 to 0.4, respectively, with respect to 1 of C.I. Direct Blue 199. The total concentration of C.I. Direct Blue 199, Exemplified Compound M8 and Exemplified Compound Bk7 contained in the ink is preferably from 1.5% by mass to 6.0% by mass, particularly preferably from 2.5% by mass to 4.5% by mass.

When the total concentration of the coloring materials contained falls within this range, the color tone of indicia and readability of 2-D bar codes can be reproduced at a higher level. In the case of this combination, the resulting ink becomes far excellent in balance of fastness properties to fading caused by light and gas.

An aqueous medium making up the ink according to the present invention together with the above-described coloring materials will now be described. The aqueous medium used in the present invention preferably comprises water as a main component. The content of water in the ink is preferably 10 to 95% by mass, more preferably 25 to 93% by mass, still more preferably 40 to 90% by mass based on the total mass of the ink. The water used in the present invention is preferably ion-exchanged water.

In the present invention, water may be used by itself as the aqueous medium. However, the effects of the present invention may also be made more marked by using a water-soluble organic solvent in combination with water.

Specific examples of water-soluble organic solvents usable in the present invention are as follows:

alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol;

amides such as dimethylformamide and dimethylacetamide;

ketones and keto-alcohols such as acetone and diacetone alcohol;

ethers such as tetrahydrofuran and dioxane;

oxyethylene or oxypropylene addition polymers such as diethylene glycol, triethylene glycol, tetraethylene glycol, dipropylene glycol, tripropylene glycol, polyethylene glycol and polypropylene glycol;

alkylene glycols the alkylene moiety of which has 2 to 6 carbon atoms, such as ethylene glycol, propylene glycol, trimethylene glycol, butylene glycol, pentanediol and hexylene glycol;

triols such as glycerol, trimethylolethane, trimethylolpropane and 1,2,6-hexanetriol;

thiodiglycol; bishydroxyethyl sulfone;

lower alkyl glycol ethers such as ethylene glycol monomethyl (or ethyl, butyl)ether, diethylene glycol monomethyl (or ethyl, butyl)ether and triethylene glycol monomethyl (or ethyl, butyl)ether;

lower dialkyl glycol ethers such as triethylene glycol dimethyl (or ethyl)ether and tetraethylene glycol dimethyl (or ethyl)ether;

alkanolamines such as monoethanolamine, diethanolamine and triethanolamine; and sulfolane, N-methyl-2-pyrrolidone, 2-pyrrolidone and 1,3-dimethyl-2-imidazolidinone.

Such water-soluble organic solvent as mentioned above may be used either singly or in any combination thereof.

The content of these water-soluble organic solvents in the ink is preferably 50% by mass or lower, particularly preferably 5 to 40% by mass, most preferably 10 to 30% by mass in total based on the total mass of the ink.

Among these solvents, ethylene glycol, diethylene glycol, triethylene glycol, 2-pyrrolidone, glycerol, polyethylene glycol- and 1,2,6-hexanetriol are preferably used.

In the ink according to the present invention, urea, ethyleneurea and derivatives thereof, trimethylolpropane, and the like may preferably be contained as humectants. In particular, ethyleneurea and trimethylolpropane are very suitable for the present invention. The content of these humectants is preferably not lower than 1% by mass and not higher than 20% by mass based on the total mass of the ink.

Besides the above components, additives for imparting desired performance to the ink, such as surfactants, antifoaming agents, surface tension modifiers, pH adjustors, viscosity modifiers, preservatives, antioxidants, evaporation accelerators, rust preventives, mildewproofing agents and chelating agents, may be incorporated into the ink as needed.

In order to improve ejection stability, a nonionic surfactant may also be added as a surfactant. Examples of preferable nonionic surfactants include the following surfactants: those having an HLB of 10 or higher, particularly 12 or higher, more preferably 15 or higher, such as polyoxyethylene alkyl ethers, polyoxyethylene alkyl phenyl ethers, polyoxyethylene fatty acid esters, sorbitan fatty acid esters, polyoxyethylene sorbitan fatty acid esters, ethylene oxide adducts of acetylene glycol.

The amount of these surfactants used is preferably 0.3% by mass or larger, particularly 0.5% by mass or larger, more preferably 0.8% by mass or larger based on the total mass of the ink for the purpose of sufficiently achieving the effect of ejection persistence. Too much amount causes too high viscosity of the ink, so the amount is preferably 3% by mass or smaller, particularly 2.5% by mass or smaller, more preferably 2.0% by mass or smaller based on the total mass of the ink.

The viscosity of the ink according to the present invention is preferably within a range of from 0.7 to 12 cP at 25° C. When the viscosity of the ink falls within the above range, normal ejection becomes feasible in ink jet recording. In addition, penetration of such an ink into a recording medium becomes fast due to the viscosity resistance thereof, and no problem arises even from the viewpoint of fixability. It is hence preferable for the ink to have a viscosity within the above range.

The ink according to the present invention makes it possible to provide an ink excellent in image characteristics such as color developability of printed images and readability of 2-D bar codes in particular as an ink used in ink jet recording and moreover excellent in storage stability of the ink and excellent in performance characteristics such as drying and fixing ability, print quality and sticking property.

The ink according to the present invention, which is made up in the above-described manner, is particularly effective when it is used in ink jet recording. In particular, its printability is important in such a field that continuous printing is essential, so that the ink is more effective. Ink jet recording methods include a recording method in which mechanical energy is caused to act on an ink to eject droplets of the ink, and a recording method in which thermal energy is applied to an ink to eject droplets of the ink by bubbling of the ink. The ink according to the present invention is particularly suitable for use in these ink jet recording methods.

[Recording Medium]

Recording media in the present invention include not only envelopes and postal cards but also all recording media on which indicia can be printed. The present invention can exhibit sufficient effects so far as a recording medium is generally used as a mail.

[Ink Jet Recording Method]

No particular limitation is imposed on an ink jet recording method that can be used in the present invention so far as the above-described ink can be used to eject droplets and form an image. However, it is necessary to print character information and design information of indicia and 2-D bar code information with high quality at a high speed on recording media such as various envelopes having various ink-absorbing properties. From this point of view, recording conditions such as image resolution, ejection amount, ejection frequency and scanning for recording and the surface tension of the ink are preferably set to conditions described below.

<Resolution>

The present inventors have carried out an extensive investigation as to the image resolution having visibility for design information and character information of indicia and being readable as a 2-D bar code image. As a result, it has been proved that a resolution of from 300×300 dpi to 600×600 dpi is preferred. If the image resolution is too low, deterioration of visibility for design information and character information, which is required for indicia, and reading failure by a 2-D bar code reader may occur in some cases. If the image resolution is too high on the other hand, character quality becomes high, but reading accuracy and mechanical processing efficiency by the 2-D bar code reader remain unchanged, resulting in mere increase in cost in some cases by making the drive of a recording apparatus minuter. An image resolution, which can satisfy the visibility and readability of the image as well as the problem of the cost at a high level, is preferably 600×300 dpi.

<Application Amount (Ejection Amount)>

In order for a 2-D bar code image recorded to have a sharpness and contrast distinguishable by a 2-D bar code reader with respect to the above-described resolution value, the application amount (ejection amount) of the ink is preferably from 15 ng to 40 ng per dot. If the application amount is less than 15 ng, the area factor is not filled up, so that a density sufficient to secure contrast may not be achieved in some cases. If the application amount exceeds 40 ng on the other hand, an area factor is filled up more than need, so that reading failure by a 2-D bar code reader may occur in some cases due to deterioration of sharpness.

With the above-described image resolution, the application amount per dot is preferably controlled within a range of from 18 ng to 30 ng for the purpose of more improving contrast and sharpness.

<Ejection Frequency, Number of Scans for Recording>

An ejection frequency of a recording head in the present invention is 10 kHz or higher for the above-described image resolution. If the ejection frequency is less than 10 kHz, the recording speed is slowed, and so it is not preferable to use such a frequency. On the other hand, an upper limit of the ejection frequency of the recording head is preferably 40 kHz or lower for the above-described image resolution. If the ejection frequency exceeds 40 kHz, the durability of the recording head is deteriorated, so that it may be difficult in some cases to retain the reliability of the recording apparatus as well as to realize stable ejection at a high frequency.

The number of scans for recording is preferably one scan from the viewpoint of recording speed.

<Surface Tension of Ink>

The surface tension of the ink according to the present invention is preferably not lower than 35 mN/m, and is further preferably not higher than 43 mN/m at 25° C. for the purpose of retaining the image quality (bleeding of the ink) of a recorded image and fixability at a high level upon recording under conditions of the above-described image resolution, ejection amount and ejection frequency. The present inventors have formed images on envelopes of various materials under the above-described recording conditions to investigate image quality thereof. As a result, it has been found that when an envelope having no ink-absorbing layer is used, dots may be attached to each other in some cases to cause marked image bleeding. A further extensive investigation has been carried out. As a result, it has been found that when the surface tension of an ink is controlled to 35 mN/m or higher, the quality of a recorded image is rapidly improved.

If the surface tension is higher than 43 mN/m on the other hand, the image bleeding is well reduced, while such an ink is liable to relatively remain on the surface of a recording medium compared with an ink low in surface tension. Accordingly, when recording media, on which indicia has been printed at a high speed, are stacked on each other, the ink may not be sufficiently fixed to the recording medium in some cases before the next recording medium is stacked thereon after forming an image. As a result, the deterioration of a 2-D bar code image easily occurs when the recording media are rubbed with each other, so that reading failure by a 2-D bar code reader may occur in some cases.

[Ink Jet Recording Apparatus]

Figure 2:
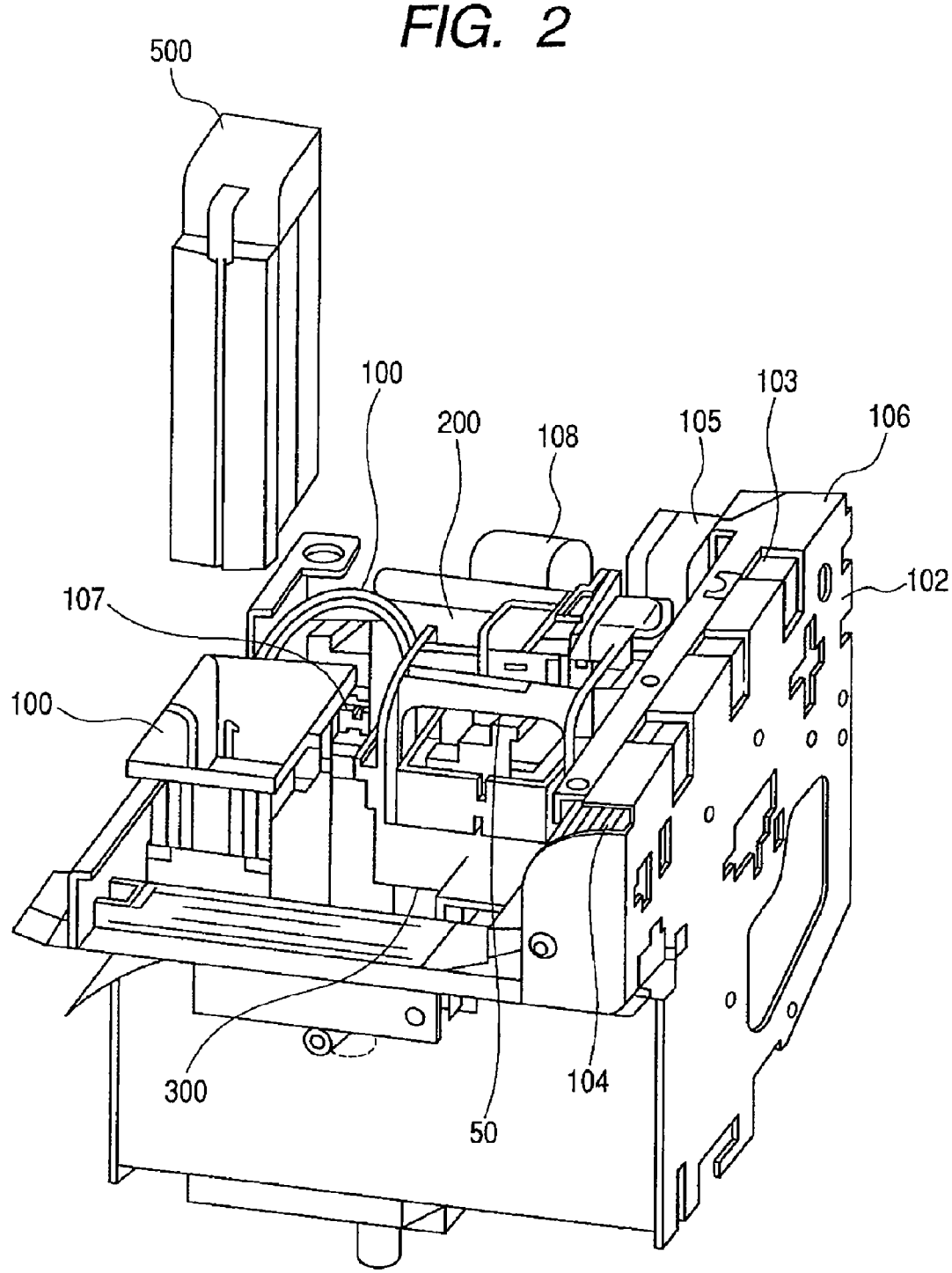
FIG. 2 is a perspective view of the whole ink jet recording apparatus according to an embodiment of the present invention.

An ink jet recording apparatus according to an embodiment of the present invention will hereinafter be described with reference to the drawings. FIG. 2 is a typical perspective view of the whole ink jet recording apparatus according to this embodiment.

This recording apparatus is a recording apparatus having a recording function detachably installed in a printing machine for continuously recording an image of a predetermined pattern on recording media such as envelopes and suitably cuttable continuous paper.

This recording apparatus is divided into the following units. First of all, this recording apparatus is equipped with a recording head unit comprising, as a principal element, a recording head 50 from which an ink is ejected to conduct recording. It is also equipped with a carriage unit having a carriage 200 on which the recording head 50 is mounted to move it between a recording position and a standby position, and the like. It is further equipped with an ink supply system unit 100 for supplying the ink to the recording head 50, in which a main tank 500 is detachably installed. It is still further equipped with a recovery system unit 300 for recovering the ink-ejecting performance of the recording head 50 by, for example, sucking out a thickened ink generated within the recording head 50, dust and the like together with the ink present in the vicinity of nozzles. Yet still further, it is equipped with a control unit having a control board 107 for electrically controlling recording operation. In addition, it is equipped with a power source unit (not illustrated). These respective units are housed in and supported by a frame 106.

The frame 106 is composed of a box the 4 sides and bottom of which are formed of a sheet metal. On one side surface 102 of the frame 106, a CR shaft 104 and a CR rail 103 for slidably supporting the carriage 200 are incorporated in parallel with each other. The carriage 200 is reciprocated along the CR rail 103 (in front and rear directions in FIG. 2) within the box by transmitting driving force of a driving motor 105 by a belt (not illustrated).

Two positions of front and rear ends of a reciprocating range of the carriage 200, on which the recording head 50 is mounted, are recording positions thereof, and the center position of the reciprocation is a recovery position by the recovery system unit 300. An electrical signal is sent to the recording head 50 at a recording position (not illustrated) to eject the ink from the plural nozzles arranged in the head, thereby applying the ink to a recording medium such as an envelope. In the recording apparatus of this embodiment, the recording head 50 is reciprocated and fixed to the recording position, the recording medium is then conveyed so as to pass through just under the nozzles of the recording head 50, thereby forming an image by controlling the ejection frequency of the recording head 50 and the conveying speed of the recording medium so as to give a desired image resolution. In the present invention, such a condition that the nozzle resolution of the recording head 50 is 600 dpi and dots are applied at 300 dpi in the conveying direction is preferred from the viewpoints of image quality, and the fixability and color developability of the ink.

Incidentally, in the above-described ink jet recording apparatus, the head is fixed by the carriage. However, the recording apparatuses according to the present invention are not limited thereto, and a printer, the recording head of which is driven in left and right directions upon printing to serially conduct printing, may be allowed. The liquid jet recording head 50 according to the present invention will hereinafter be described in detail.

<Recording Head>

Figure 3:
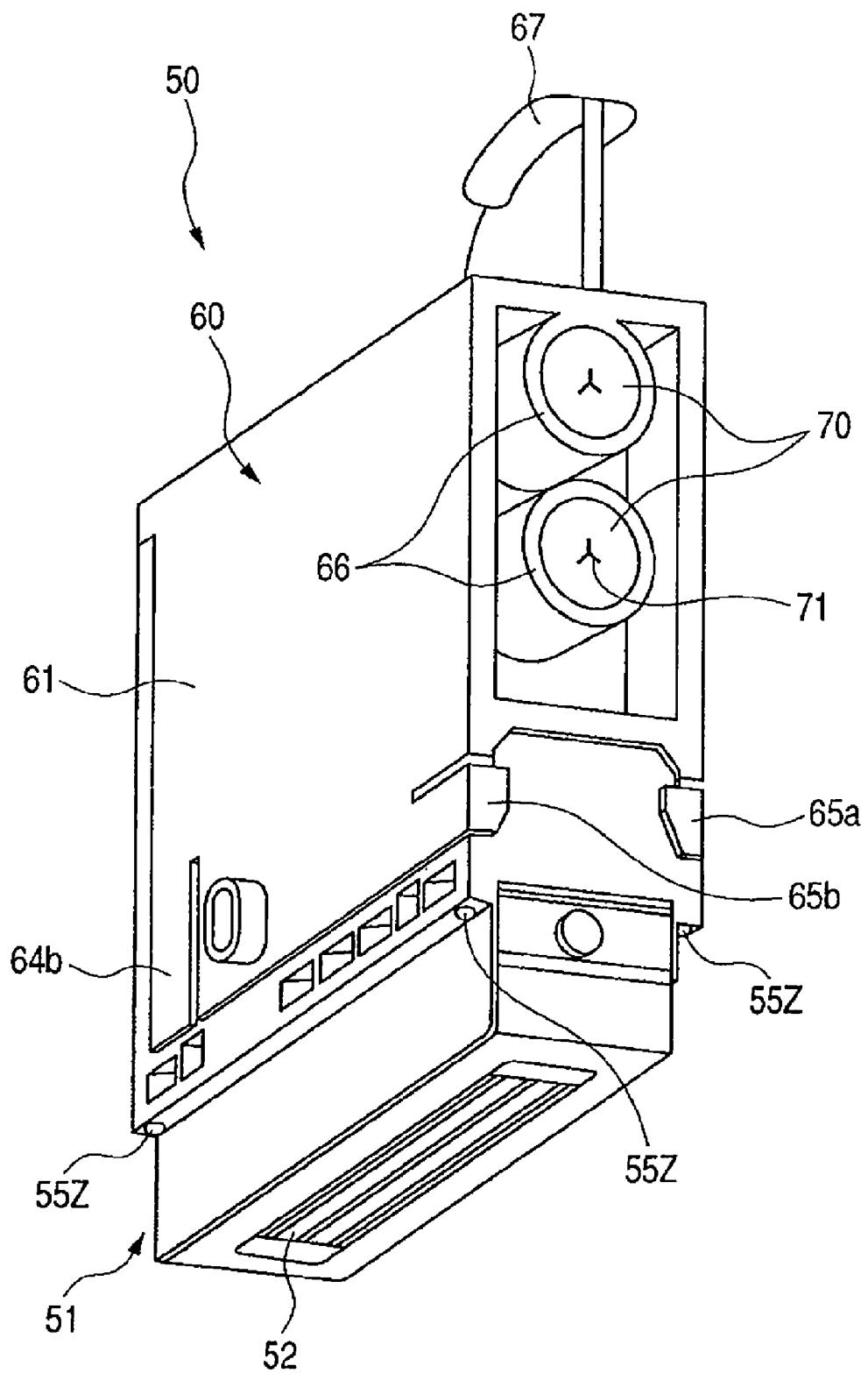
FIG. 3 is a perspective view illustrating a liquid jet recording head according to an embodiment of the present invention.
Figure 4:
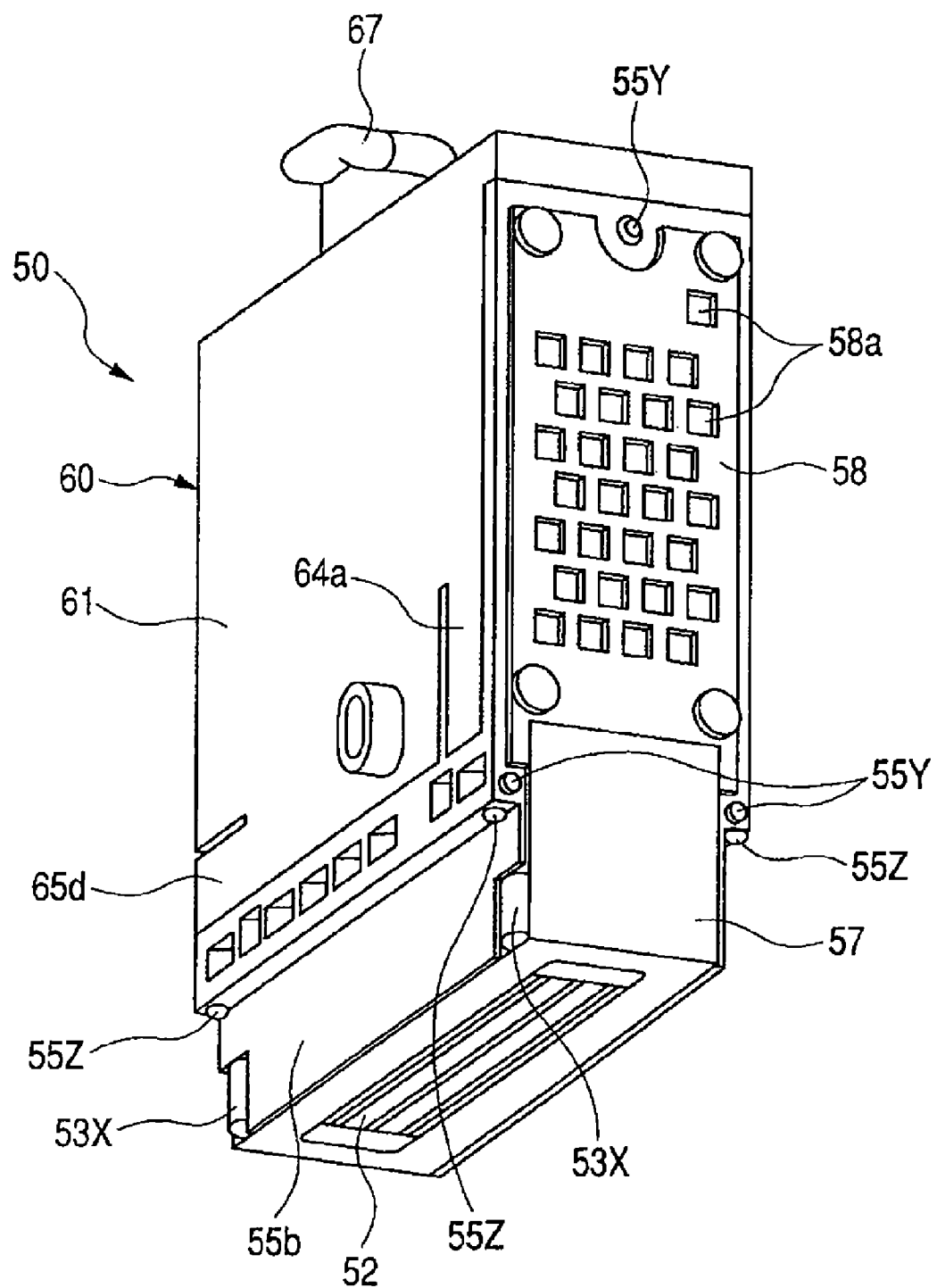
FIG. 4 is a perspective view illustrating a liquid jet recording head according to an embodiment of the present invention.
Figure 5:
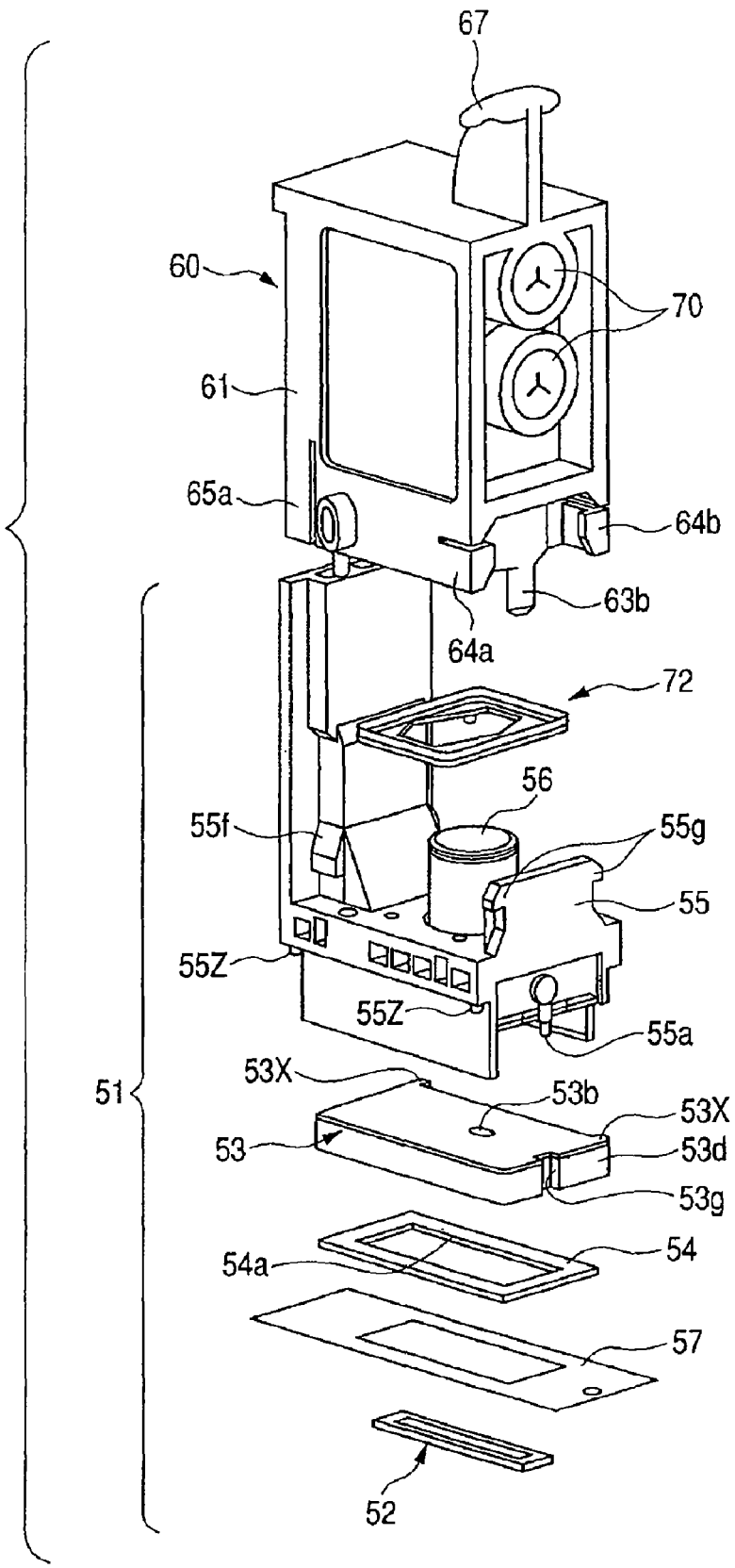
FIG. 5 is an exploded perspective view illustrating the liquid jet recording heads shown in FIG. 3 and FIG. 4.
Figure 6:
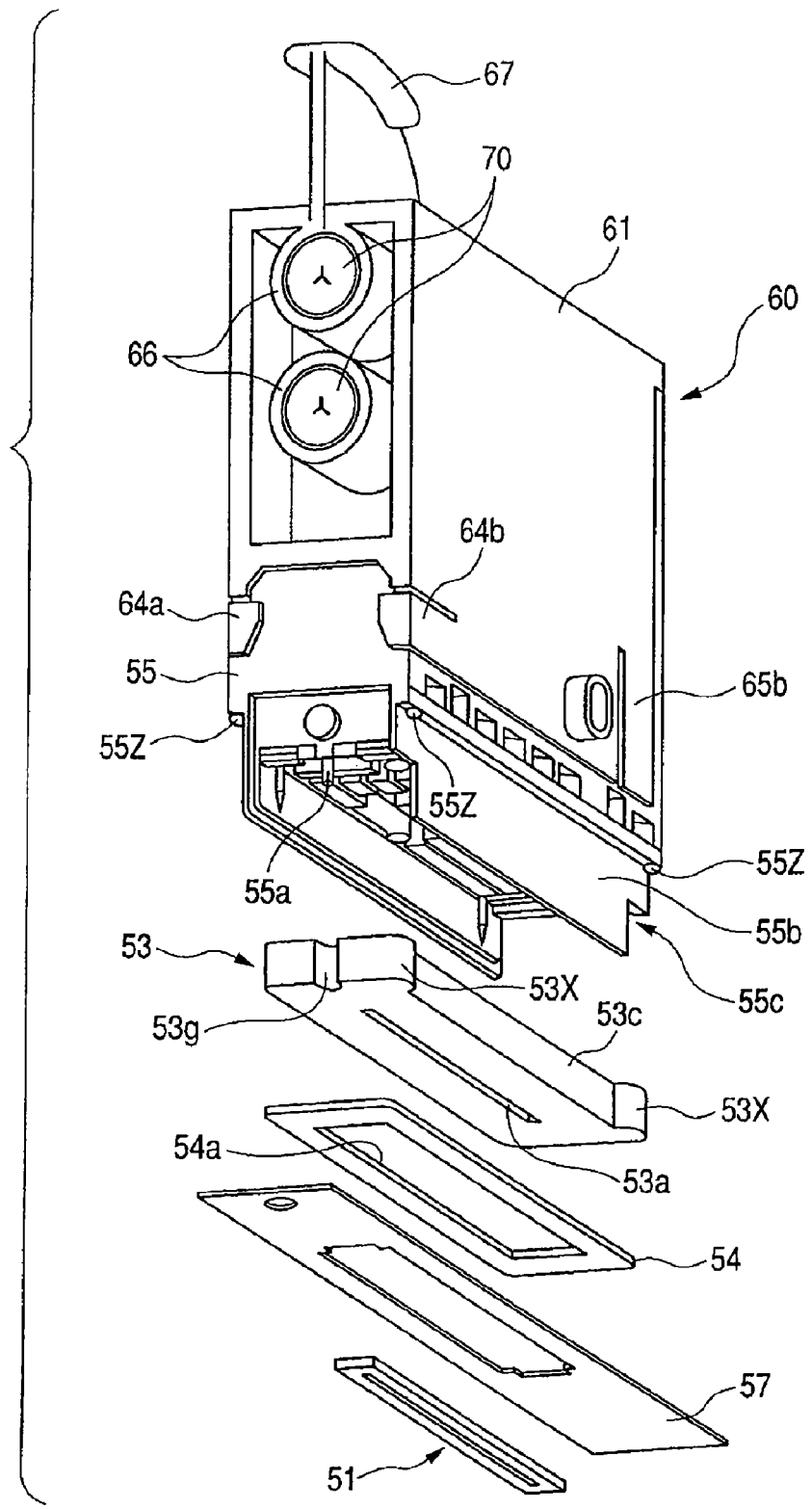
FIG. 6 is an exploded perspective view illustrating the liquid jet recording heads shown in FIG. 3 and FIG. 4.

FIG. 3 and FIG. 4 are perspective views illustrating the liquid jet recording head 50, and FIG. 5 and FIG. 6 are exploded perspective views illustrating the liquid jet recording head 50. As illustrated in these drawings, the recording head 50 is constructed as a cartridge capable of being detachably mounted on the carriage 200 of the ink jet recording apparatus shown in FIG. 2. The recording head is composed of a recording unit (head chip) 51 shown in FIG. 5 and a recording liquid storage unit 60 shown in FIG. 5 and FIG. 6. The recording unit 51 and the recording liquid storage unit 60 can be detachably connected to each other. The recording liquid storage unit 60 stores an ink to be supplied to the recording unit 51, and the recording unit 51 forms ink droplets for recording to eject them.

Figure 7:
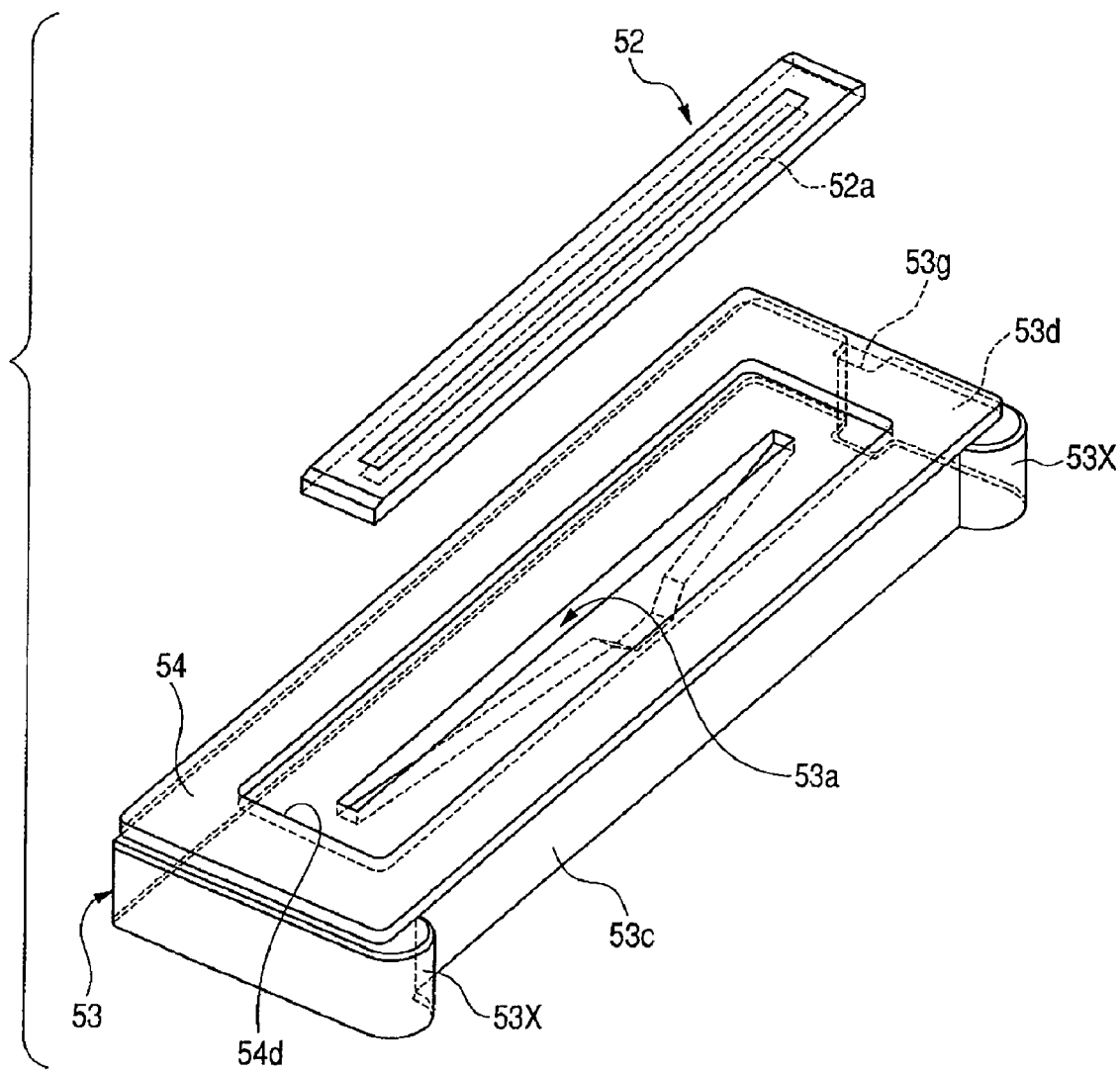
FIG. 7 is an enlarged perspective view illustrating a principal part of the liquid jet recording heads shown in FIG. 3 and FIG. 4.

As illustrated in FIG. 3 to FIG. 6, the recording unit 51 is mainly constructed by the following components. More specifically, the unit is constructed by a recording element substrate (recording element array) 52, a supporting substrate (supporting part) 53, a plate 54, a flow-path-forming member (main body) 55, a porous member (filter) 56, a sheet electric wiring substrate 57, a contact terminal wiring substrate 58, etc. The recording element substrate 52 is composed of an Si substrate, on one surface of which plural recording elements (electrothermal converters) for ejecting a recording liquid and wirings composed of Al or the like (which will be described in detail in FIG. 10) for supplying electric power to the respective recording elements are formed by a film forming technique. In this Si substrate, plural recording liquid flow paths and plural ejection openings (both, not illustrated) are formed with high accuracy by a photolithographic technique so as to correspond to the respective recording elements. As illustrated in FIG. 7, the recording element substrate 52 has, on the back surface side (side of the supporting substrate 53) thereof, a recording liquid supply opening 52a for supplying the recording liquid from the recording liquid storage unit 60 to the plural recording liquid flow paths connected to the respective ejection openings.

Figure 10:
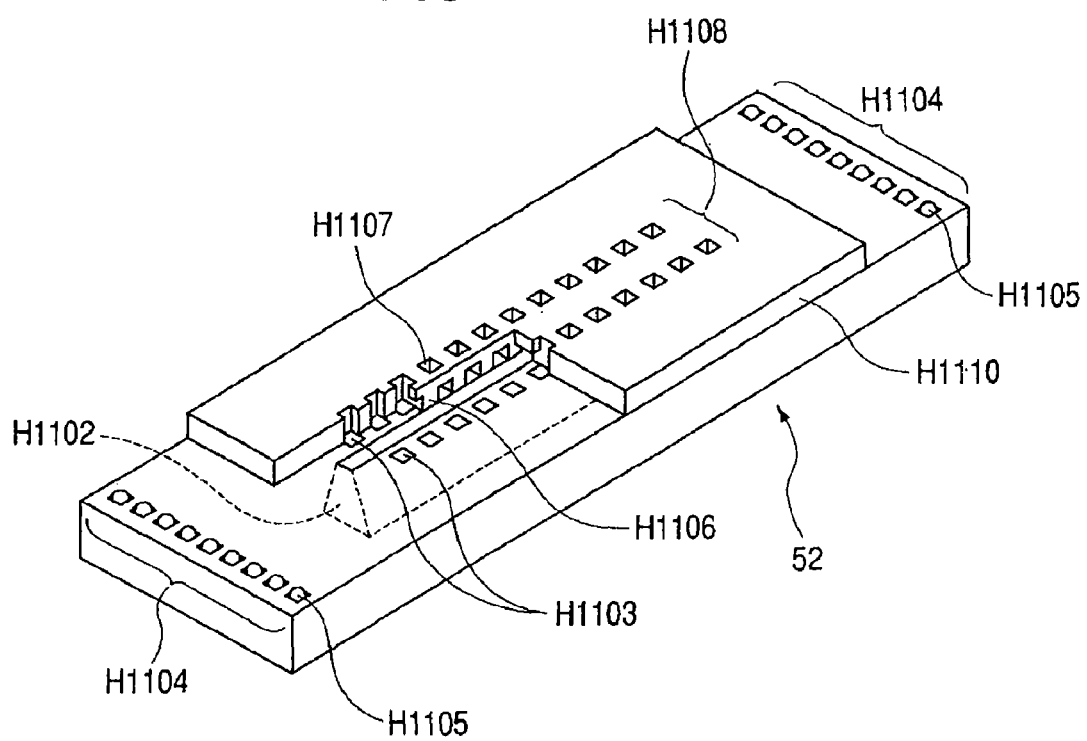
FIG. 10 is a partially cutaway perspective view of a recording element substrate.

FIG. 10 is a partially cutaway perspective view for explaining the construction of the recording element substrate 52. For a first recording element substrate H1100, for example, an ink supply opening H1102 of a long groove-like through-opening that is an ink flow path is formed to an Si substrate H1110 having a thickness of 0.5 to 1 mm by a method such as anisotropic etching utilizing the crystal orientation of Si and sand blasting. Rows of electrothermal converters H1103 are arranged and formed on both sides between which the ink supply opening H1102 is provided, and electric wirings composed of Al or the like (not illustrated) for supplying electric power to the electrothermal converters H1103 are further formed. These electrothermal converters H1103 and electric wirings are formed by a film forming technique. The electrothermal converters H1103 are arranged in a zigzag form with respect to the rows. In other words, the positions of the ejection openings in the rows are arranged to slightly deviate from each other so as not to align in the direction perpendicular to the arranged row direction. An ejection amount from each nozzle is preferably from 15 ng to 40 ng because suitability for a wide variety of recording media is improved. Electrode parts H1104 for supplying electric power to the electric wirings and supplying electric signals for driving the electrothermal converters H1103 are arranged and formed along side edges on both external sides of the electrothermal converters H1103. Bumps H1105 composed of Au or the like are formed on the electrode parts 1104.

On the surface of the Si substrate H1110, on which these patterns have been formed, a structured material composed of a resin material is formed by a photolithographic technique. Such a structured material has ink flow path walls H1106 forming respective ink flow paths corresponding to the electrothermal converters H1103 and a top part covering the upper portions thereof, and ejection openings H1107 are formed in the top part. The ejection openings H1107 are provided in opposition to the electrothermal converters H1103 to form an ejection opening group H1108. In this first recording element H1100, the ink supplied from the ink flow path H1102 is ejected from the ejection openings 1107 provided in opposition to the respective electrothermal converters H1103 by the pressure of bubbles produced by heat generated from the electrothermal converters H1103.

Incidentally, in the present invention, a liquid jet recording head having such a nozzle arrangement that the ejection openings H1107 are arranged in 2 rows in a zigzag form at intervals of 300 dpi in each row is a preferred embodiment. In this case, the ejection amount from each nozzle is preferably 15 to 40 ng. According to such an embodiment, an overlapped state of dots on a recording medium is properly balanced, the color developability of a printed portion is improved, and at the same time a sufficiently high-definition image can be formed from the viewpoint of readability of character information and 2-D bar codes.

The recording element substrate 52 is bonded to the supporting substrate 53. The supporting substrate 53 is formed from a rigid material such as ceramic or alumina and has a recording liquid flow path 53a for supplying the ink to the recording element substrate 52. The recording liquid flow path 53a is linked to a supply opening 53b (see FIG. 5) provided on the back surface side (side of the flow-path-forming member 55) of the supporting substrate 53. The plate 54 is fixed to the supporting substrate 53 with an adhesive or the like. This plate 54 has an opening 54a for avoiding interference with the recording element substrate 52, and the recording element substrate 52 is arranged within this opening 54a. The supporting substrate 53 is fixed to the flow-path-forming member 55 with a bonding means such as an adhesive or screws.

As illustrated in FIG. 5, the flow-path-forming member 55 is in a substantially L-shaped form and has a recording liquid flow path (not illustrated) for circulating the ink in the interior thereof. When the supporting substrate 53 is fixed to the flow-path-forming member 55, the recording liquid flow paths of both members come to be linked to each other through the supply opening 53b and the like. The porous member 56 is further bonded to the flow-path-forming member 55. The porous member 56 is bonded to the flow-path-forming member 55 from a side opposite to the supporting substrate 53. This porous member 56 prevents dust from contaminating the recording liquid from an upstream side, i.e., from the side of the recording liquid storage unit 60.

The sheet electric wiring substrate 57 is bonded to an upper surface of the plate 54 on the supporting substrate 53, and the sheet electric wiring substrate 57 is electrically connected to respective recording elements of the recording element substrate 52. This sheet electric wiring substrate 57 is connected to the contact terminal wiring substrate 58 arranged on a rear surface of the flow-path-forming member 55 by a connecting means such as ACF, lead bonding, wire bonding or connectors. A series of electric wiring parts formed by connecting the sheet electric wiring substrate 57 to the contact terminal wiring substrate 58 serves to apply electric signals for ejecting the recording liquid to the recording element substrate 52.

The contact terminal wiring substrate 58 has plural signal input terminals 58a for receiving electric signals from the side of the ink jet recording apparatus shown in FIG. 2, whereby electric recording signals for recording of an image can be given from the main body of the ink jet recording apparatus shown in FIG. 2 to the respective recording elements of the recording element substrate 52 through the contact terminal wiring substrate 58 and the sheet electric wiring substrate 57. When electric pulse signals, which become recording signals, are given from the ink jet recording apparatus shown in FIG. 2 to the respective electrothermal converters that are such recording elements as described above, thermal energy is given to the recording liquid and bubbling (film boiling) of the recording liquid is caused by phase change of the recording liquid at that time. Droplets are ejected from the respective ejection openings of the recording head 50 by the bubble pressure of this bubbling. Incidentally, in this embodiment, the electric wiring parts are made up by the sheet electric wiring substrate 57 and the contact terminal wiring substrate 58, which are separate from each other. However, the present invention is not limited thereto. In other words, an electric wiring member obtained by integrating the sheet electric wiring substrate 57 and the contact terminal wiring substrate 58 may also be used.

Figure 8:
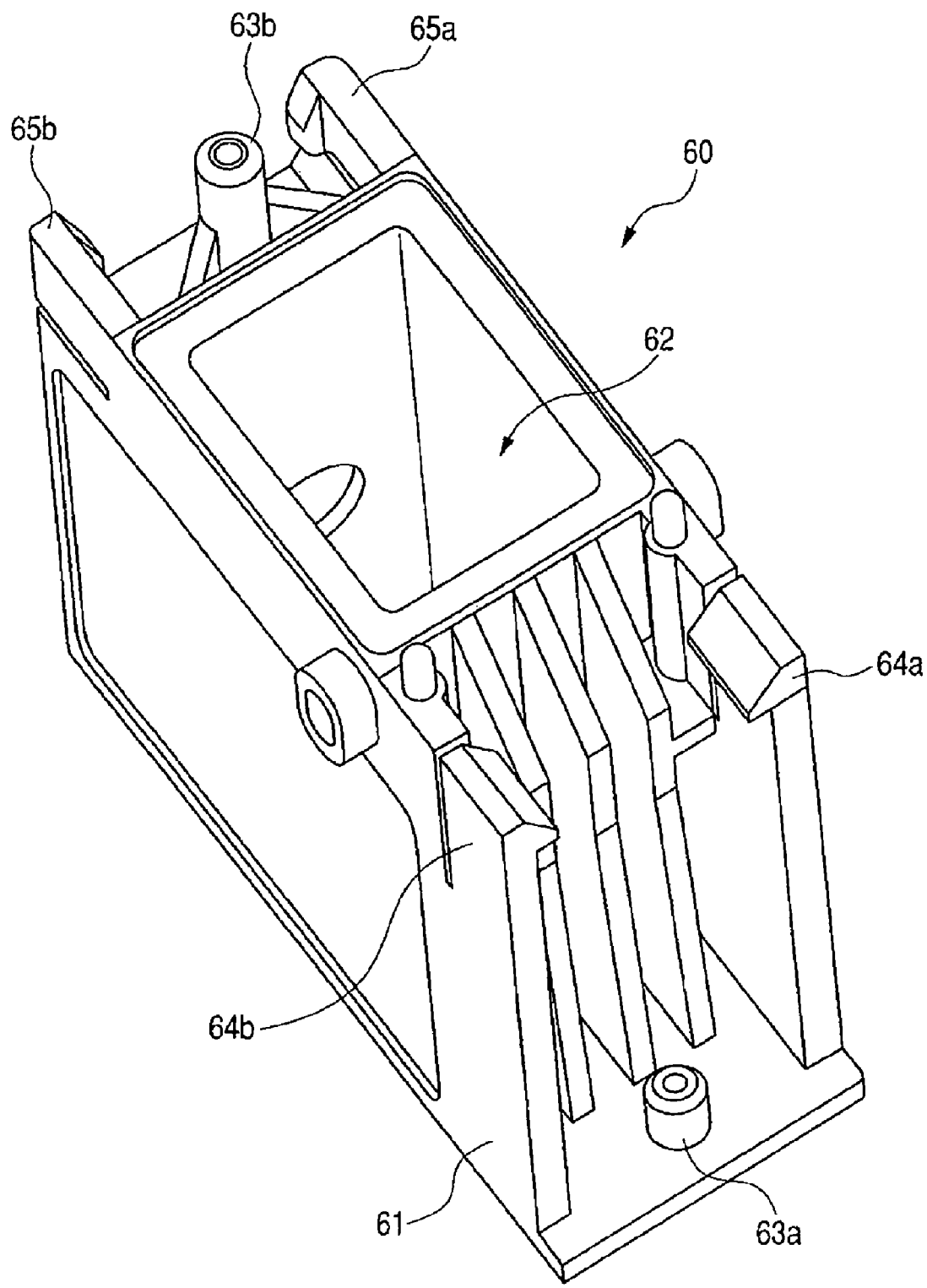
FIG. 8 is a perspective view illustrating a recording liquid storage unit making up the liquid jet recording heads shown in FIG. 3 and FIG. 4.
Figure 9:
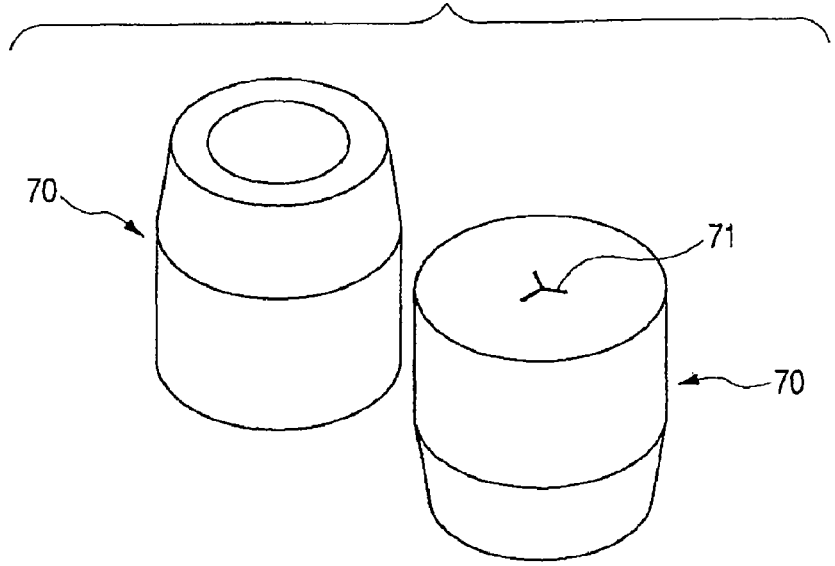
FIG. 9 is an enlarged perspective view illustrating a joint rubber fitted in the recording liquid storage unit.

A method for supplying the ink according to the present invention to the recording head will be described. As shown in FIG. 3 and so on, a cylindrical portion 66 and a joint rubber 70 are arranged at 2 vertical positions of a back surface of a casing 61. Among these, the cylindrical portion 66 and joint rubber 70 on the lower side make up a supply flow path for supplying the ink from an external recording liquid storage tank (not illustrated) arranged in the ink jet recording apparatus shown in FIG. 2. In other words, the ink according to the present invention is supplied to the interior of a common liquid chamber 62 illustrated in FIG. 8 through this supply flow path. At that time, a needle (not illustrated) for recording liquid supply provided on the side of the ink jet recording apparatus shown in FIG. 2 is smoothly inserted into the common liquid chamber 62 in the casing 61 so as to open a slit 71 provided at a central portion of the joint rubber in FIG. 9, whereby the ink according to the present invention is supplied. On the other hand, the cylindrical portion 66 and joint rubber 70 on the upper side make up an air intake passage for discharging air present in the interior of the common liquid chamber 62 to the outside to form a negative pressure in the interior of the common liquid chamber 62. The air present in the interior of the common liquid chamber 62 is discharged to the outside through this air intake passage by means of a suction means such as a pump, whereby the internal pressure of the common liquid chamber 62 is controlled. In other words, the negative pressure within the common liquid chamber 62 is increased by using this air intake passage, whereby the supply of the recording liquid to the interior of the common liquid chamber 62 can be controlled.

Incidentally, the above-described ink jet recording head is such that the ink according to the present invention is suitably supplied from the external recording liquid storage tank to the recording liquid storage unit within the recording head. However, a recording head obtained by integrating an ink tank and a recording unit and having no external recording liquid storage tank may also be equally used so far as it is a head capable of ejecting the ink according to the present invention.

The ink jet recording apparatus shown in FIG. 2 has been described for one in which the recording head 50 capable of storing and ejecting only one ink is installed. However, the present invention is not limited thereto. A recording head, in which plural inks of different colors are stored, may also be used so far as a bar code image can be formed at a resolution of from 300×300 dpi to 600×600 dpi by one scan.

EXAMPLES

The present invention will hereinafter be described more specifically by the following Examples and Comparative Examples. However, the present invention is not limited by the following Examples unless being beyond the gist of the present invention. Incidentally, all designations of "part" or "parts" and "%" as will be used in the following examples mean part or parts by mass and % by mass unless expressly noted.

Examples 1 to 6 and Comparative Examples 1 to 4

Preparation of Ink

The components shown in the following Table 2 were added in amounts shown therein, and the respective mixtures were adjusted with water so as to give a total amount of 100 parts. These components were mixed and sufficiently stirred into solutions. Thereafter, the solutions were filtered under pressure through a microfilter (product of Fuji Photo Film Co., Ltd.) having a pore size of 0.2 μm, thereby preparing inks. The surface tensions of the resultant inks were measured at 25° C. by means of an automatic surface tensiometer (Model: CBVP-Z) manufactured by Kyowa Interface Science Co., Ltd. and found to be 38 mN/m in all inks.

TABLE 2

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| --- | --- | --- | --- | --- | --- | --- | --- | --- | --- | --- |
| DBL199 | 2.5 | 2.0 | 2.0 | 2.0 | 1.4 | 6.0 | 1.6 | — | 1.5 | 0.9 |
| AB9 | — | — | — | — | — | — | — | 1.7 | — | — |
| Exemplified Compound M8 | — | 0.5 | 0.6 | 0.7 | 0.6 | 1.5 | 0.4 | — | — | 0.2 |
| AR52 | — | — | — | — | — | — | — | 0.6 | — | — |
| Exemplified Compound Bk7 | 1.0 | — | 0.6 | 0.3 | 0.2 | — | — | — | 0.5 | 1.2 |
| FB2 | — | 0.3 | — | — | — | — | — | — | — | — |

TABLE 2-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|
| Gly | 7.0 | 7.0 | 7.0 | 7.0 | 7.0 | 7.0 | 7.0 | 7.0 | 7.0 | 7.0 |
| TMP | 7.0 | 7.0 | 7.0 | 7.0 | 7.0 | 7.0 | 7.0 | 7.0 | 7.0 | 7.0 |
| DEG | 5.0 | 5.0 | 5.0 | 5.0 | 5.0 | 5.0 | 5.0 | 5.0 | 5.0 | 5.0 |
| AE100 | 0.2 | 0.2 | 0.2 | 0.2 | 0.2 | 0.2 | 0.2 | 0.2 | 0.2 | 0.2 |
| Water | Balance | Balance | Balance | Balance | Balance | Balance | Balance | Balance | Balance | Balance |

Unit: Parts

The abbreviations in the Table indicate the following compounds.

DBL199: C.I. Direct Blue 199

AB9: C.I. Acid Blue 9

AR52: C.I. Acid Red 52

FB2: C.I. Food Black 2

Gly: glycerol

TMP: trimethylolpropane

DEG: diethylene glycol

AE100: Acetylenol E100 (product of Kawaken Fine Chemicals Co., Ltd.).

Incidentally, both Exemplified Compound M8 and Exemplified Compound Bk7 were used in the form of an Na salt.

The maximum absorption wavelength at 380 to 780 nm of C.I. Food Black 2 was 585 nm, and the maximum absorption wavelength of Exemplified Compound Bk7 was 482 nm.

Each of the inks of Examples and Comparative Examples shown in Table 2 was stored in a vacant tank to evaluate it. As a recording apparatus, was used the ink jet recording apparatus shown in FIG. 2, in which the head shown in FIG. 3 having an On-Demand type multi-recording head that ejects an ink by applying thermal energy according to recording signals to the ink was installed. A commercially available white woven envelope (product of Georgia-Pacific Co., ISO whiteness degree: 83%, Stökigt sizing degree: 12 seconds) was used as a recording medium. Printing was conducted by such a method (the so-called one-pass printing) that an ink is applied in an amount of 25 ng per dot under conditions of an image resolution of 600×300 dpi and an ejection frequency of 15 kHz to form an image by one scan.

(1) $a^*$ and $b^*$ of printed portion, and integrated value of reflection spectrum:

The ink was applied in an amount of 25 ng to each pixel at the resolution of 600×300 dpi to print a solid image on the recording medium so as to give an application amount of the ink of 4.5 mg per square inch, and the resultant print was left to stand for 24 hours after the printing. The printed portion of the print was subjected to colorimetry by means of "Spectrolino" manufactured by Gretag Co. The measuring conditions were as follows: observation light source: D50, observation viewing angle: 2 degrees, density: ANSI. A, white standard: Abs and filter: No, thereby determining $a^*$, $b^*$ and reflection spectrum of the printed portion. The reflection spectrum is determined as reflection intensities at every 10 nm in a region of from 380 to 730 nm under the above measuring conditions. The integrated value S of the reflection spectrum was determined on the basis of the resultant reflection spectrum in accordance with the above-described method. Likewise, the integrated value S1 of the reflection spectrum in a region of from 380 nm to 550 nm and the integrated value S2 of the reflection spectrum in a region of from 560 nm to 730 nm were determined to calculate out S1/S2.

These results are shown in Table 3.

(2) Readability:

A 2-D bar code (Data Matrix ECC200) of a size of 2 cm×2 cm was printed on 100 recording media at a resolution of 600×300 dpi and was read by a commercially available bar code reader. The proportion [(the number of recording media having the bar code that could not be read/100)×100] of 2-D bar codes that could not be read was regarded as fraction defective (%) of reading to evaluate readability in accordance with the following standard. The results are shown in Table 3.

A: the fraction defective of reading was lower than 5%;

B: the fraction defective of reading was not lower than 5% and lower than 10%;

C: the fraction defective of reading was not lower than 10%.

(3) Color Tone, Visibility

A German post type indicia pattern of a size of 4 cm×2 cm was printed at a resolution of 600×300 dpi to visually evaluate the indicia as to color tone and visibility in accordance with the following standard. At that time, the indicia was observed from a distance 30 cm away as a distance of distinct vision. The results are shown in Table 3.

Color Tone:

A: a blue color preferable as indicia was exhibited;

B: a color of somewhat different color tone, but the indicia was recognizable as one of a blue color;

C: a color of clearly different color tone as indicia.

Visibility:

A: the indicia was clearly recognizable;

B: the indicia was somewhat faint, but recognizable;

C: the indicia was so faint that it was hard to be recognized.

(4) Intermittent Ejection Stability

A 100% duty solid image was printed at a resolution of 600×300 dpi under an environment of 15° C. in temperature and 10% in humidity by using all nozzles of the head shown in FIG. 3 by means of the ink jet recording apparatus shown in FIG. 2. Thereafter, the ink jet recording apparatus was left to stand for 12 seconds, and only one dot of the ink was ejected again by using all the nozzles to print a ruled line. The formed state of the ruled line was ranked in accordance with the following standard.

A: no break of the ruled line was observed;

B: dots became small, but the ruled line was formed;

C: the ruled line became blurred, and was not partly formed.

TABLE 3

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|
| a* | −9 | −2 | 0 | 4 | 0 | 5 | −2 | 2 | −11 | −2 |
| b* | −15 | −30 | −22 | −30 | −31 | −33 | −41 | −46 | −14 | −13 |
| S | 54 | 73 | 61 | 65 | 81 | 70 | 100 | 91 | 81 | 65 |
| S1/S2 | 1.5 | 1.8 | 1.5 | 1.4 | 1.8 | 1.8 | 1.9 | 1.0 | 1.6 | 1.0 |
| Readability | A | A | A | A | B | A | C | C | B | A |
| Color tone | B | B | A | A | A | A | B | B | C | C |
| Visibility | A | A | A | A | B | A | C | C | B | A |
| Intermittent ejection stability | A | A | A | A | A | B | A | A | A | A |

From the results shown in Table 3, it is understood that in the inks according to Examples 1 to 6, images preferable in terms of readability, color tone and visibility of 2-D bar codes are formed. The inks according to Examples 1 to 5 were also good in intermittent ejection stability.

Examples 7 to 12 and Comparative Examples 5 to 9

Preparation of Ink

The components shown in the following Table 4 were added in amounts shown therein, and the respective mixtures were adjusted with water so as to give a total amount of 100 parts. These components were mixed and sufficiently stirred into solutions. Thereafter, the solutions were filtered under pressure through a microfilter (product of Fuji Photo Film Co., Ltd.) having a pore size of 0.2 μm, thereby preparing inks. The surface tensions of the resultant inks were measured at 25° C. by means of an automatic surface tensiometer (Model: CBVP-Z) manufactured by Kyowa Interface Science Co., Ltd. and found to be 38 mN/m in all inks.

DEG: diethylene glycol

AE100: Acetylenol E100 (product of Kawaken Fine Chemicals Co., Ltd.).

All Exemplified Compound M8, Exemplified Compound Bk4 and Exemplified Compound Bk7 were used in the form of a Na salt.

The maximum absorption wavelength at 380 to 780 nm of C.I. Food Black 2 was 585 nm, the maximum absorption wavelength of Exemplified Compound Bk4 was 656 nm, and the maximum absorption wavelength of Exemplified Compound Bk7 was 482 nm.

Each of the inks of Examples and Comparative Examples shown in Table 4 was stored in a vacant tank to evaluate it. As a recording apparatus, was used the ink jet recording apparatus shown in FIG. 2, in which the head shown in FIG. 3 having an On-Demand type multi-recording head that ejects an ink by applying thermal energy according to recording signals to the ink was installed. A commercially available white woven envelope (product of Georgia-Pacific Co., ISO whiteness

TABLE 4

|  | Ex. 7 | Ex. 8 | Ex. 9 | Ex. 10 | Ex. 11 | Ex. 12 | Comp. Ex. 5 | Comp. Ex. 6 | Camp. Ex. 7 | Comp. Ex. 8 | Comp. Ex. 9 |
|---|---|---|---|---|---|---|---|---|---|---|---|
| DBL199 | 1.6 | 1.6 | 0.9 | 2.0 | 1.6 | 2.0 | 1.6 | — | 1.5 | 0.9 | 1.6 |
| AB9 | — | — | — | — | — | — | — | 1.7 | — | — | — |
| Exemplified Compound M8 | — | 0.4 | 0.2 | 0.7 | 0.6 | 1.2 | 0.4 | — | — | 0.2 | 0.9 |
| AR52 | — | — | — | — | — | — | — | — | 0.5 | — | — |
| Exemplified Compound Bk7 | 1.0 | — | 1.0 | 0.3 | 0.1 | 0.6 | — | — | — | 1.2 | 1.0 |
| FB2 | — | 0.2 | — | — | — | — | — | — | — | — | — |
| Exemplified Compound Bk4 | — | — | — | — | — | — | — | — | 0.5 | — | — |
| Gly | 7.0 | 7.0 | 7.0 | 7.0 | 7.0 | 7.0 | 7.0 | 7.0 | 7.0 | 7.0 | 7.0 |
| EG | 7.0 | 7.0 | 7.0 | 7.0 | 7.0 | 7.0 | 7.0 | 7.0 | 7.0 | 7.0 | 7.0 |
| DEG | 5.0 | 5.0 | 5.0 | 5.0 | 5.0 | 5.0 | 5.0 | 5.0 | 5.0 | 5.0 | 5.0 |
| AE100 | 0.2 | 0.2 | 0.2 | 0.2 | 0.2 | 0.2 | 0.2 | 0.2 | 0.2 | 0.2 | 0.2 |
| Water | Balance | Balance | Balance | Balance | Balance | Balance | Balance | Balance | Balance | Balance | Balance |

Unit: parts

The abbreviations in the Table indicate the following compounds.

DBL199: C.I. Direct Blue 199

AB9: C.I. Acid Blue 9

AR52: C.I. Acid Red 52

FB2: C.I. Food Black 2

Gly: glycerol

EG: ethylene glycol degree: 83%, Stökigt sizing degree: 12 seconds) was used as a recording medium. Printing was conducted by such a method (the so-called one-pass printing) that an ink is applied in an amount of 25 ng per dot under conditions of an image resolution of 600×300 dpi and an ejection frequency of 15 kHz to form an image by one scan.

(1) a* and b* of printed portion, and integrated value of reflection spectrum:

The ink was applied in an amount of 25 ng to each pixel at the resolution of 600×300 dpi to print a solid image on the recording medium so as to give an application amount of the ink of 4.5 mg per square inch, and the resultant print was left to stand for 24 hours after the printing. The printed portion of the print was subjected to colorimetry by means of "Spectrolino" manufactured by Gretag Co. The measuring conditions were as follows: observation light source: D50, observation viewing angle: 2 degrees, density: ANSI. A, white standard: Abs and filter: No, thereby determining a, b and reflection spectrum of the printed portion. The reflection spectrum is determined as reflection intensities at every 10 nm in a region of from 380 to 730 nm under the above measuring conditions. The integrated value S of the reflection spectrum was determined on the basis of the resultant reflection spectrum in accordance with the above-described method. Likewise, the integrated value S1 of the reflection spectrum in a region of from 380 to 550 nm and the integrated value S2 of the reflection spectrum in a region of from 560 to 730 nm were determined to calculate out S1/S2.

These results are shown in Table 5.

(2) Readability:

A 2-D bar code (Data Matrix FCC200) of a size of 2 cm×2 cm was printed on 100 recording media at a resolution of 600×300 dpi and was read by a commercially available bar code reader. The proportion [(the number of recording media having the bar code that could not be read/100)×100] of 2-D bar codes that could not be read, was regarded as fraction defective (%) of reading to evaluate readability in accordance with the following standard. The results are shown in Table 5.

A: the fraction defective of reading was lower than 5%;

B: the fraction defective of reading was not lower than 5% and lower than 10%;

C: the fraction defective of reading was not lower than 10%.

(3) Color Tone, Visibility:

A German post type indicia pattern of a size of 4 cm×2 cm was printed at a resolution of 600×300 dpi to visually evaluate the indicia as to color tone and visibility in accordance with the following standard. At that time, the indicia was observed from a distance 30 cm away as a distance of distinct vision. The results are shown in Table 5.

Color Tone:

A: a blue color preferable as indicia was exhibited;

B: a color of somewhat different color tone, but the indicia was recognizable as one of a blue color;

C: a color of clearly different color tone as indicia.

Visibility:

A: the indicia was clearly recognizable;

B: the indicia was somewhat faint, but recognizable;

C: the indicia was so faint that it was hard to be recognized.

From the results shown in Table 5, it is understood that in the inks according to Examples 7 to 12, images preferable in terms of readability, color tone and visibility of 2-D bar codes are formed.

Examples 13 to 34

Components shown in the following Table 6 were added in amounts shown therein, and the mixture was adjusted with water so as to give a total amount of 100 parts. These components were mixed and sufficiently stirred into a solution. Thereafter, the solution was filtered under pressure through a microfilter (product of Fuji Photo Film Co., Ltd.) having a pore size of 0.2 µm, thereby preparing an ink. The surface tension of the resultant ink was measured at 25° C. by means of an automatic surface tensiometer (Model: CBVP-Z) manufactured by Kyowa Interface Science Co., Ltd. and found to be 38 mN/m.

The resultant ink was used to determine a* and b* of a printed portion and integrated values (S1 and S1/S2) of reflection spectrum in the same manner as in Example 1. As a result, a* and b* were 4 and −30, respectively, S1 was 65, and S1/S2 was 1.4.

TABLE 6

|  | Ink A |
|---|---|
| C.I. Direct Blue 199 | 2.0 |
| Exemplified Compound M8 | 0.7 |
| Exemplified Compound Bk7 | 0.3 |
| Triethylene glycol | 7.0 |
| Trimethylolpropane | 7.0 |
| Diethylene glycol | 5.0 |
| Acetylenol E100 | 0.2 |
| Proxel GXL (S) | 0.05 |
| Water | Balance |

Unit: parts

Only the amounts of Acetylenol E100 and water, which were components of Ink A, were adjusted to obtain Inks B to E having their corresponding surface tension values shown in Table 7. These inks were used to determine a* and b* of printed portions and integrated values (S1 and S1/S2) of reflection spectrum in the same manner as in Example 1. As a result, a* and b* were 4 and −30, respectively, S1 was 65, and S1/S2 was 1.4.

TABLE 7

|  | Ink B | Ink C | Ink D | Ink E |
|---|---|---|---|---|
| Surface tension [mN/m] | 34 | 35 | 43 | 44 |

TABLE 5

|  | Ex. 7 | Ex. 8 | Ex. 9 | Ex. 10 | Ex. 11 | Ex. 12 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| WBk/Wt | 0.38 | 0.05 | 0.48 | 0.10 | 0.04 | 0.16 | — | — | 0.03 | 0.52 | 0.25 |
| a* | −9 | −3 | −2 | 4 | 0 | 8 | −2 | 2 | −17 | −2 | 6 |
| b* | −18 | −35 | −16 | −30 | −31 | −20 | −41 | −46 | −24 | −13 | −10 |
| S | 65 | 89 | 50 | 65 | 81 | 70 | 100 | 91 | 75 | 65 | 53 |
| S1/S2 | 1.6 | 1.9 | 1.1 | 1.4 | 1.8 | 1.6 | 1.9 | 1.0 | 2.2 | 1 | 1.0 |
| Readability | A | B | A | A | B | A | C | C | B | A | A |
| Color tone | B | B | B | A | A | A | B | B | C | C | C |
| Visibility | A | A | A | A | B | A | C | C | B | A | A |

Each of the inks shown in Tables 6 and 7 was stored in a vacant tank to evaluate it. As a recording apparatus, was used the ink jet recording apparatus shown in FIG. 2, in which the head shown in FIG. 3 having an On-Demand type multi-recording head that ejects an ink by applying thermal energy according to recording signals to the ink was installed. Inks and the conditions of image resolution, ejection amount, ejection frequency and number of scans for recording are shown in Table 8.

contrast required to distinguish a highlight portion and a shadow portion of a 2-D bar code from each other is hard to be achieved. If the ejection amount is great on the other hand, sufficient sharpness is hard to be achieved due to overlap between ink dots. If the surface tension of the ink is low, ink mist and image bleeding are easy to occur, and sharpness is hard to be achieved. Therefore, readability by a 2-D bar code reader is liable to be deteriorated. An experimental method for readability will hereinafter be described.

TABLE 8

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|
| Image resolution [dots/inch$^2$] | 600 × 300 | 300 × 300 | 600 × 600 | 600 × 300 | 600 × 300 | 600 × 300 | 600 × 300 | 600 × 300 | 600 × 300 | 600 × 300 | 600 × 300 |
| Ejection amount [ng] | 25 | 25 | 25 | 15 | 17 | 18 | 30 | 31 | 40 | 25 | 25 |
| Ejection frequency [kHz] | 15 | 15 | 15 | 15 | 15 | 15 | 15 | 15 | 15 | 10 | 40 |
| Number of scans for recording | 1 | 1 | 1 | 1 | 1 | 1 | 1 | 1 | 1 | 1 | 1 |
| Ink | Ink A | Ink A | Ink A | Ink A | Ink A | Ink A | Ink A | Ink A | Ink A | Ink A | Ink A |
| Surface tension of ink [mN/m] | 38 | 38 | 38 | 38 | 38 | 38 | 38 | 38 | 38 | 38 | 38 |
| Integrated value of reflection spectrum | 65 | 65 | 65 | 65 | 65 | 65 | 65 | 65 | 65 | 65 | 65 |

|  | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|
| Image resolution [dots/inch$^2$] | 600 × 300 | 600 × 300 | 600 × 300 | 600 × 300 | 150 × 150 | 900 × 900 | 600 × 300 | 600 × 300 | 600 × 300 | 600 × 300 | 600 × 300 |
| Ejection amount [ng] | 25 | 25 | 25 | 25 | 25 | 25 | 14 | 41 | 25 | 25 | 25 |
| Ejection frequency [kHz] | 15 | 15 | 15 | 41 | 15 | 15 | 15 | 15 | 9 | 15 | 15 |
| Number of scans for recording | 1 | 1 | 1 | 1 | 1 | 1 | 1 | 1 | 1 | 2 | 1 |
| Ink | Ink C | Ink D | Ink E | Ink A | Ink A | Ink A | Ink A | Ink A | Ink A | Ink A | Ink B |
| Surface tension of ink [mN/m] | 35 | 43 | 44 | 38 | 38 | 38 | 38 | 38 | 38 | 38 | 34 |
| Integrated value of reflection spectrum | 65 | 65 | 65 | 65 | 65 | 65 | 65 | 65 | 65 | 65 | 65 |

<Visibility>

Visibility is liable to be affected by image resolution and ejection amount. In other words, if the image resolution and ejection amount are low, a indicia pattern, character information and the like are hard to be visually recognized. If the ejection amount is high on the other hand, the visibility is liable to be deteriorated because overlap between ink dots becomes great. An experimental method for visibility will hereinafter be described.

A German post type indicia pattern of a size of 4 cm×2 cm was printed to visually evaluate the indicia as to visibility in accordance with the following standard. At that time, the indicia was observed from a distance 30 cm away as a distance of distinct vision. The results are shown in Table 9. As a recording medium, was used a Pergaminhulle transparent envelope, weiss (white) envelope produced by Zanders Co. This envelope has no ink-absorbing layer and is thus poor in ink absorbency.

A: the indicia was clearly recognizable;

B: the indicia was somewhat faint, but recognizable;

C: the indicia was so faint that it was hard to be recognized.

<Readability>

Readability is liable to be affected by image resolution, ejection amount and the surface tension of an ink. In other words, if the image resolution is low, and the ejection amount is small, the area factor is not filled up, so that sufficient A 2-D bar code (Data Matrix ECC200) of a size of 2 cm×2 cm was printed on 100 recording media and was read by a commercially available bar code reader. The proportion [(the number of recording media having the bar code that could not be read/100)×100] of 2-D bar codes that could not be read was regarded as fraction defective (%) of reading to evaluate readability in accordance with the following standard. The results are shown in Table 9. Incidentally, as recording media, were used the above-described Pergaminhulle transparent envelopes, Weiss (white) produced by Zanders Co. In this test, a reading test was conducted after the printed envelopes were stored for 5 minutes under conditions where they were not stacked on each other.

A: the fraction defective of reading was lower than 5%;

B: the fraction defective of reading was not lower than 5% and lower than 10%;

C: the fraction defective of reading was not lower than 10%.

<Recording Speed>

The recording speed is liable to be affected by ejection frequency and number of scans for recording. In other words, if the ejection frequency is low at a certain resolution, the recording speed is lowered in proportion thereto. If the number of scans for recording is set to at least 2 scans, it simply becomes double or more compared with the case of one scan. An experimental method for recording speed will hereinafter be described.

A German post type indicia pattern of a size of 4 cm×2 cm was printed on commercially available white woven envelopes (products of Georgia-Pacific Co., ISO whiteness degree: 83%, Stökigt sizing degree: 12 seconds) to count the number of envelopes printed per minute. The evaluation was made in accordance with the following standard. The results are shown in Table 9.

A: not less than 280 envelopes per minute;

C: less than 280 envelopes per minute.

<Printing Durability>

Printing durability is liable to be affected by image resolution and ejection frequency. In other words, if the image resolution and ejection frequency are high, the frequency of use of a heater is increased upon recording on envelopes of the same number, so that there is a fear that ejection failure caused by abrasion of a heater protecting film, breaking of wire, kogation, etc. would occur. An experimental method for printing durability will hereinafter be described.

After a German post type indicia pattern of a size of 4 cm×2 cm was printed on 50,000 commercially available white woven envelopes (products of Georgia-Pacific Co., ISO whiteness degree: 83%, Stökigt sizing degree: 12 seconds), a nozzle check pattern was printed. The evaluation was made in accordance with the following standard. The results are shown in Table 9.

A: neither ejection failure nor dot misalignment was observed;

B: ejection failure, dot misalignment or the like was somewhat observed;

C: ejection failure, dot misalignment or the like was observed in plenty.

<Readability after Stacking>

Readability after stacking is liable to be affected by surface tension of an ink. In other words, if the surface tension of the ink is too high, relative fixability is liable to be deteriorated, so that the quality of 2-D bar code images is lowered due to rubbing of recording media with each other, and readability is liable to be deteriorated. An experimental method for readability after stacking will hereinafter be described. Incidentally, when readability before stacking is poor, the readability after stacking is also poor irrespective of fixability.

A 2-D bar code (Data Matrix ECC200) of a size of 2 cm×2 cm was printed on 100 commercially available white woven envelopes (products of Georgia-Pacific Co., ISO whiteness degree: 83%, Stökigt sizing degree: 12 seconds), and the envelopes were stored in such a manner that they are stacked on one another just after the printing. Thereafter, a reading test was conducted by means of a commercially available bar code reader to make evaluation by defining the proportion [(the number of envelopes having the bar code that could not be read/100)×100] of 2-D bar codes that could not be read as fraction defective (%) of reading. The evaluation was made in accordance with the following standard. The results are shown in Table 9.

A: the fraction defective of reading was lower than 5%;

B: the fraction defective of reading was not lower than 5% and lower than 10%;

C: the fraction defective of reading was not lower than 10%.

TABLE 9

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|
| Visibility | A | A | A | A | A | A | A | A | A | A | A |
| Readability | A | A | A | A | A | A | A | A | A | A | A |
| Color tone | A | A | A | A | A | A | A | A | A | A | A |
| Recording speed | A | A | A | A | A | A | A | A | A | A | A |
| Printing durability | A | A | A | A | A | A | A | A | A | A | B |
| Readability after stacking | A | B | A | B | B | A | A | B | B | A | A |

|  | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|
| Visibility | A | A | A | A | B | A | A | A | A | A | B |
| Readability | A | A | A | A | B | A | B | B | A | A | B |
| Color tone | A | A | A | A | A | A | A | A | A | A | A |
| Recording speed | A | A | A | A | A | C | A | A | C | C | A |
| Printing durability | A | A | A | B | A | C | A | A | A | A | A |
| Readability after stacking | A | A | B | A | C | A | C | C | A | A | B |

From the results shown in Table 9, it is understood that in Examples 13 to 27, visibility, readability, recording speed, printing durability and readability after stacking are achieved at the same time at a high level.

Examples 35 to 39

As described above, the occurrence of ink mist is liable to be affected by surface tension of an ink. Therefore, in Examples 35 to 39, the occurrence of ink mist affected by the surface tensions of inks was compared by setting other recording conditions than the surface tension of each ink constant. An experiment on ink mist will hereinafter be described.

Each of the above-described Inks A to E was stored in the recording apparatus shown in FIG. 2 to print a German post type indicia pattern on 50,000 commercially available white woven envelopes (products of Georgia-Pacific Co., ISO whiteness degree: 83%, Stökigt sizing degree: 12 seconds) under their corresponding conditions shown in the following Table 10. After the printing, condition of adherence of ink mist to the interior of the recording apparatus was observed. The evaluation was made in accordance with the following standard. The results are shown in Table 11.

A: soiling by ink mist was not observed, or very small;

B: soiling by ink mist was small;

C: soiling by ink mist was large.

TABLE 10

| | Ex. 35 | Ex. 36 | Ex. 37 | Ex. 38 | Ex. 39 |
|---|---|---|---|---|---|
| Image resolution [dots/inch²] | 600 × 300 | 600 × 300 | 600 × 300 | 600 × 300 | 600 × 300 |
| Ejection amount [ng] | 25 | 25 | 25 | 25 | 25 |
| Ejection frequency [kHz] | 15 | 15 | 15 | 15 | 15 |
| Number of scans for recording | 1 | 1 | 1 | 1 | 1 |
| Ink | Ink A | Ink C | Ink D | Ink E | Ink B |
| Surface tension of ink [mN/m] | 38 | 35 | 43 | 44 | 34 |

TABLE 11

| | Ex. 35 | Ex. 36 | Ex. 37 | Ex. 38 | Ex. 39 |
|---|---|---|---|---|---|
| Observation of ink mist | A | B | A | A | C |

From the results shown in Table 11, it is understood that the surface tension of an ink may affect the occurrence of ink mist, the surface tension of an ink is preferably 35 mN/m or higher from the viewpoint of readability of 2-D bar codes.

This application claims the benefit of Japanese Patent Application Nos. 2005-266796, filed Sep. 14, 2005, 2005-266797, filed Sep. 14, 2005, and 2005-266798, filed Sep. 14, 2005, which are hereby incorporated by reference herein in their entirety.

What is claimed is:

1. A mailing ink for use in ink jet recording, which provides an 'a*' of from −10 to 15 and a 'b*' of from −50 to −15 according to the CIE L*a*b* color system in a printed portion obtained by applying the ink to a recording medium so as to give an application amount of ink of 4.5 mg per square inch, and provides an integrated value of reflection spectrum of 90 or lower in a wavelength region of from 380 nm to 730 nm in the printed portion.

2. The mailing ink according to claim 1, wherein the a* and b* in the CIE L*a*b* color system of the printed portion are from 0 to 10 and from −40 to −15, respectively.

3. The mailing ink according to claim 1, wherein the integrated value of reflection spectrum in the wavelength region of from 380 nm to 730 nm in the printed portion is 80 or lower.

4. The mailing ink according to claim 1, wherein the integrated value of reflection spectrum in the wavelength region of from 380 nm to 730 nm in the printed portion is 30 or higher.

5. The mailing ink according to claim 1, wherein the ratio (S1/S2) of an integrated value S1 of reflection spectrum in a wavelength region of from 380 nm to 550 nm to the integrated value S2 of reflection spectrum in a wavelength region of from 560 nm to 730 nm of the printed portion is 1.2 or higher.

6. The mailing ink according to claim 1, wherein the ratio (S1/S2) of the integrated value S1 of reflection spectrum in the wavelength region of from 380 nm to 550 nm to an integrated value S2 of reflection spectrum in the wavelength region of from 560 nm to 730 nm of the printed portion is 3.0 or lower.

7. The mailing ink according to claim 1, wherein the ink comprises a blue type color coloring material and a black type color coloring material.

8. The mailing ink according to claim 7, wherein the proportion (WBk/Wt) of the concentration WBk (% by mass) of the black type color coloring material in the ink to the total concentration Wt (% by mass) of all coloring materials contained in the ink is not lower than 0.04 and lower than 0.5.

9. The mailing ink according to claim 1, wherein the ink has a surface tension of 35 mN/m or higher.

10. An ink jet recording method for mailing, comprising conducting ink jet recording with a mailing ink, the ink providing an 'a*' of from −10 to 15 and a 'b*' of from −50 to −15 according to the CIE L*a*b* color system in a printed portion obtained by applying the ink to a recording medium so as to give an application amount of ink of 4.5 mg per square inch, and providing an integrated value of reflection spectrum of 90 or lower in a wavelength region of from 380 nm to 730 nm in the printed portion.

11. The ink jet recording method for mailing according to claim 10, wherein the resolution upon the ink jet recording is from 300×300 dots to 600×600 dots per square inch, and wherein the recording is conducted by one scan.

12. The ink jet recording method for mailing according to claim 11, wherein the application amount of the ink upon the ink jet recording is from 15 ng to 40 ng per dot.

13. The ink jet recording method for mailing according to claim 11, wherein the ejection frequency upon the ink jet recording is 10 kHz or higher.

14. The ink jet recording method for mailing according to claim 11, wherein the ink has a surface tension of 35 mN/m or higher.

* * * * *